(12) United States Patent
Foster et al.

(10) Patent No.: US 9,756,548 B2
(45) Date of Patent: Sep. 5, 2017

(54) SELF-ORGANIZING NETWORK

(71) Applicant: AIRCOM INTERNATIONAL LTD, Surrey (GB)

(72) Inventors: Gerard Terrance Foster, Marston Meysey (GB); Colin Gordon Bowdery, Plano, TX (US)

(73) Assignee: AIRCOM INTERNATIONAL LTD, Leatherhead, Surrey (GB)

( * ) Notice: Subject to any disclaimer, the term of this patent is extended or adjusted under 35 U.S.C. 154(b) by 448 days.

(21) Appl. No.: 14/369,195

(22) PCT Filed: Dec. 21, 2012

(86) PCT No.: PCT/GB2012/053245
§ 371 (c)(1),
(2) Date: Jun. 27, 2014

(87) PCT Pub. No.: WO2013/098559
PCT Pub. Date: Jul. 4, 2013

(65) Prior Publication Data
US 2014/0355484 A1    Dec. 4, 2014

(30) Foreign Application Priority Data

Dec. 30, 2011 (GB) .................................. 1122454.0

(51) Int. Cl.
*H04W 4/00* (2009.01)
*H04W 40/12* (2009.01)
(Continued)

(52) U.S. Cl.
CPC ........... *H04W 40/12* (2013.01); *H04W 16/18* (2013.01); *H04W 24/02* (2013.01); *H04W 84/18* (2013.01)

(58) Field of Classification Search
CPC .................................................... H04W 24/02
See application file for complete search history.

(56) References Cited

U.S. PATENT DOCUMENTS 8,301,149 B2   10/2012   del Rio Romero et al.
2004/0054766 A1   3/2004   Vicente
(Continued)

FOREIGN PATENT DOCUMENTS

EP          2219402 A2   8/2010
WO   WO 2011/046705 A1   4/2011

OTHER PUBLICATIONS

International Search Report in PCT/GB2012/053245 mailed Mar. 6, 2013.
(Continued)

*Primary Examiner* — Mark Rinehart
*Assistant Examiner* — Matthew Hopkins
(74) *Attorney, Agent, or Firm* — ATFirm PLLC; Ralph P. Albrecht

(57) ABSTRACT

A method for optimizing a self organizing network comprising a plurality of cells. The method comprises monitoring performance measurement data indicative of performance of one or more cells in a group of cells in the network, and monitoring trace data indicative of traffic statistics within the cells of the group. The method comprises generating, from the performance management data and the trace data, a plurality of key performance indicators each indicative of performance of an aspect of a cell in the group, and processing the key performance indicators so as to generate a hotspot value indicative of general performance of the cell in the group. The method comprises comparing the hotspot value with a threshold hotspot value, and if the hotspot value is greater than the threshold hotspot value, processing attribute data from the cells in the group so as to generate cause data indicative of a cause associated with the hotspot value exceeding the hotspot threshold value. The method also comprises generating, from the cause data, recommendation data for modifying an attribute of the network, and modi- (Continued)

fying the attribute of the network based on the recommendation data.

27 Claims, 7 Drawing Sheets

(51) Int. Cl.
*H04W 24/02* (2009.01)
*H04W 16/18* (2009.01)
*H04W 84/18* (2009.01)

(56) References Cited

U.S. PATENT DOCUMENTS

2010/0203881 A1* 8/2010 del Rio Romero ... H04W 24/08
455/423
2011/0320588 A1* 12/2011 Raleigh ............... H04W 36/245
709/224

OTHER PUBLICATIONS

Sujuan Feng et al.; "Self-Organizing Networks (SON) in 3GPP Long Term Evolution," Internet Citation, May 20, 2008, pp. 1-15, XP007907980, Retrieved from Internet: URL: http://www.nomor.de/uploads/gc/TQ/gcTQfDWApo9osPfQwQoBzw/SelfOrganisingNetworksInLTE_2008-05.pdf (retrieved Mar. 27, 2009), p. 3, left-hand column, lines 1-14 section 2, Coverage and Capacity Optimization; figure 8.

* cited by examiner

SELF-ORGANIZING NETWORK

The present invention relates to networks and in particular, but not exclusively, to a method for optimising a self organising network and apparatus for optimising a self organising network.

In the field of mobile telecommunications, cellular operators are increasingly seeking to constrain costs. Typically, a significant part of a cellular operator's operational expenditure (OPEX) (e.g. around 25% of total yearly revenue) for running a network goes towards a component of OPEX typically referred to as Network Operations.

In this context, Network Operations includes managing and optimising the network. As the mobile operator marketplace matures, there are very few new entrants to the market and most are mobile operators who have been established in the market for some years. Therefore, most mobile operators have at least two, and typically three, generations of concurrent mobile technology to maintain.

Problems that a mobile operator often face are that the quantity of data for carrying out Network Operations can be more than the resources available to the mobile operator for processing that data and that analysis of the data can be time consuming. A mobile operator may typically wish to carry out data analysis to generate a useful recommendation to apply to the network, for example by tracking movement of mobile user traffic and accommodating user trends to try to maximise user experience, maximise revenue and minimise churn. In the context of mobile telecommunications, churn is typically taken to mean the number of contractual users who leave the contract during a given period of time.

Additionally, a common pricing tariff provided by mobile operators is a so-called "all-you-can-eat" tariff, in which data download limits to a user's device are not capped. These tariffs have been very popular with users but mobile operators are starting to find it difficult to deal with the resultant contractually unbounded increase in traffic data. As such, cellular operators have moved towards providing contracts which have an upper limit of data usage, in which the user will be charged for data exceeding the upper limit. However, the upper limit of data usage provided by these contracts still tends to be greater than the available capacity of a typical network.

More recently, developments in telecommunications network architectures such as the 3GPP LTE (Third Generation Partnership Project Long Term Evolution—often referred to as 3.9G) network architecture and 3GPP LTE-Advanced architecture (often referred to as 4G) can provide a larger user device throughput, for example per unit of spectrum bandwidth (e.g. 5 MHz, or more generally NxMHz, where Nx is any appropriate bandwidth value). However, adding such capability to a telecommunications infrastructure tends to be costly, especially as many mobile operators are also concurrently supporting other generations of telecommunications network architectures such as GSM (Global System for Mobile Communications), GPRS (General Packet Radio Service), and UMTS (Universal Mobile Telecommunications System). Additionally, existing equipment for the different generations of network architectures may need to be updated when rolling out 3.9G/4G.

In order to try to reduce operational cost, mobile operators are becoming increasingly interested in so called "self organising networks" (SON) such as those described in 3GPP releases 8 to 11. SON can help provide automatic optimisation of a network, thus requiring fewer staff in a Network Operations team. Current SON techniques may be applied in a so-called "distributed" manner where SON techniques are implemented at a base station level within a mobile network, or a so-called "centralised" manner, where SON techniques are implemented at a level above operation support systems (OSS) which manage network elements of the mobile network.

The 3GPP standard (3GPP Technical Specification 32.500, Rel-10, version 10.1.0, available 8 Oct. 2010) defines requirements for several SON algorithms. These include Automatic Neighbour Relation (ANR) and Inter-Cell Interference Control (ICIC) algorithms. Whilst ANR and ICIC could be applied at either a distributed or centralised layer, they are typically more suited to distributed implementation in a distributed layer because of their more localised cell group controlling aspect. For a centralised layer implementation, for example in 3GPP, a so-called coverage and capacity optimisation (CCO) algorithm tends to be more suitable because a CCO algorithm typically requires data from more cells than algorithms for distributed implementation (e.g. ANR or ICIC algorithm) in order to perform well. CCO requirements are defined in the 3GPP standard (3GPP Technical Specification 32.500, Rel-10, version 10.1.0, available 8 Oct. 2010), but implementation is determined by a network provider rather than being specifically defined in the standard.

ANR and ICIC algorithms can provide optimisation based on a local cell level measurement of the network. In other words, optimisation can be thought of as being distributed between cells. Such algorithms can typically react quickly to any changes in the network. However, these techniques tend to be limited to measuring data from a few interfaces surrounding a particular cell and therefore a change to a cell under test may adversely affect a cell some distance from the cell under test because the optimisation is based on a local measurement.

Centralised algorithms are typically deployed at a level above an Operation and Management Centre (OMC) of the network and usually employ data generated from northbound interfaces (i.e. output only interfaces) from the OMC. In other words, analysis for the network can be thought of as being centralised. However, such systems can be slow to react to changes in the network at a per cell level but may be faster than distributed implementations to react to a mobility area level problem involving many cells in a group. For SON optimisation techniques implemented in a centralised manner, an amount of data needed to be input to the system to obtain an optimisation recommendation which meets desired confidence and reliability criteria tends to be non-trivial, and the data resources needed to analyse data from the whole network can be large.

The 3GPP standard (3GPP Technical Specification 32.500, Rel-10, version 10.1.0, available 8 Oct. 2010) also defines the use of distributed and centralised optimisation techniques implemented in a cooperative manner. These are typically referred to as Hybrid SON techniques (e.g. in 3GPP systems). Hybrid SON techniques may provide better optimisation than distributed or centralised techniques implemented individually, but tend to be complex to implement, especially with respect to hardware resource management (for example, memory resource management and management of processing resources) and optimisation coordination.

The present disclosure seeks to alleviate or mitigate the above problems. For example, the present disclosure seeks to provide an improved SON hybrid optimisation technique.

In a first aspect, there is provided a method for optimising a self organising network comprising a plurality of cells, the method comprising: monitoring performance measurement data indicative of performance of one or more cells in a group of cells in the network; monitoring trace data indicative of traffic statistics within the cells of the group; generating, from the performance management data and the trace data, a plurality of key performance indicators each indicative of performance of an aspect of a cell in the group; processing the key performance indicators so as to generate a hotspot value indicative of general performance of the cell in the group; comparing the hotspot value with a threshold hotspot value, and if the hotspot value is greater than the threshold hotspot value, processing attribute data from the cells in the group so as to generate cause data indicative of a cause associated with the hotspot value exceeding the hotspot threshold value; generating, from the cause data, recommendation data for modifying an attribute of the network; and modifying the attribute of the network based on the recommendation data.

In a second aspect, there is provided an apparatus for optimising a self organising network comprising a plurality of cells, the apparatus comprising: means for monitoring performance management data indicative of performance of one or more cells in a group of cells in the network; means for monitoring trace data indicative of traffic statistics within the cells of the group; means for generating, from the performance management data and the trace data, a plurality of key performance indicators each indicative of performance of an aspect of a cell in the group; means for processing the key performance indicators so as to generate a hotspot value indicative of general performance of the a cell in the group; comparing means for comparing the hotspot value with a threshold hotspot value, and if the hotspot value is greater than the threshold hotspot value, the comparing means is operable to process attribute data from the cells in the group so as to generate cause data indicative of a cause associated with the hotspot value exceeding the hotspot threshold value; means for generating, from the cause data, recommendation data for modifying an attribute of the network; and means for modifying the attribute of the network based on the recommendation data.

In a third aspect, there is provided an apparatus for optimising a self organising network comprising a plurality of cells, the apparatus comprising: a performance management data monitoring unit configured to monitor performance management data indicative of performance of one or more cells in a group of cells in the network; a trace data monitoring unit configured to monitor trace data indicative of traffic statistics within the cells of the group; a key performance indicator generating unit arranged to generate, from the performance management data and the trace data, a plurality of key performance indicators each indicative of performance of an aspect of a cell in the group; a processing unit configured to process the key performance indicators so as to generate a hotspot value indicative of general performance of the a cell in the group; a comparator arranged to compare the hotspot value with a threshold hotspot value, and if the hotspot value is greater than the threshold hotspot value, process attribute data from the cells in the group so as to generate cause data indicative of a cause associated with the hotspot value exceeding the hotspot threshold value; a generating unit configured to generate, from the cause data, recommendation data for modifying an attribute of the network; and a modifying unit arranged to modify the attribute of the network based on the recommendation data.

Various other aspects and features are defined in the appended claims.

The techniques of the disclosure can help provide an improved hybrid SON optimisation technique. In particular, performance management data and trace data can be monitored and processed to generate key performance indicators. For example, the key performance indicators can then be processed to generate hotspot values and the cause of the hotspot values evaluated to generate a recommendation for improving the operation of the network. In other words, for example, operation of a telecommunications network can be assessed at different levels using the performance management data and the trace data and used to generate a recommendation. Therefore, for example, optimisation may be simplified and the optimisation of the network improved.

Examples of the disclosure will now be described by way of example with reference to the accompanying drawings, in which.

The disclosure relates to network optimisation. In the following description, a number of specific details are presented in order to provide a thorough understanding of the examples. It will be apparent however to a person skilled in the art that these specific details need not be employed to practise the present disclosure. Conversely, specific details known to the person skilled in the art are omitted for the purposes of clarity in presenting the examples.

Examples of the implementation and use of the approaches of the implementation are discussed in the following.

Figure 1:
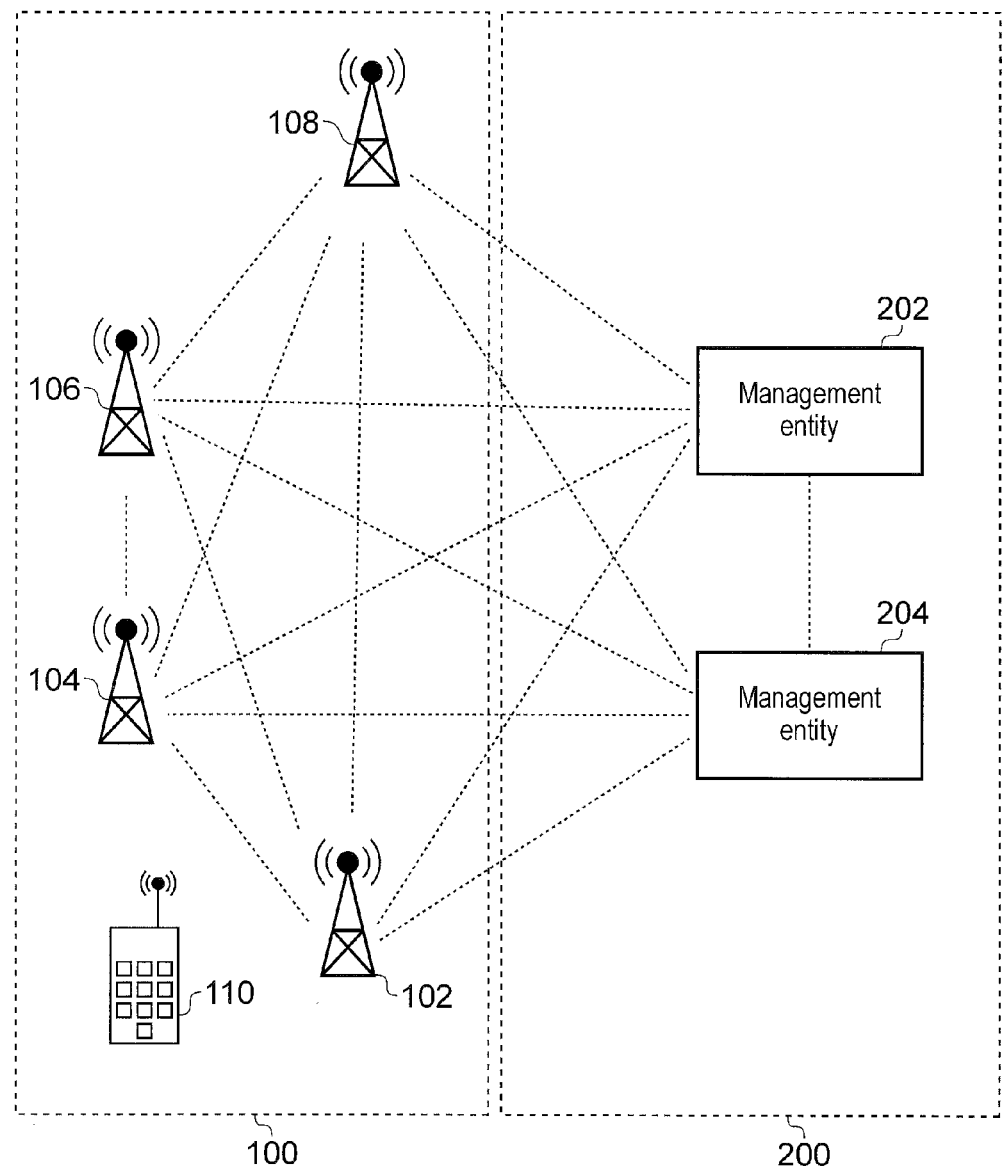
FIG. 1 is a schematic diagram of an example of a multi-node communications network.

An example of a multi-node communications network is shown schematically in FIG. 1. In this example, in order to provide a straightforward illustrative example context, the network architecture is presented in generic terms.

It will be appreciated by the skilled user that such a communications network may implement any of a number of standards-based or proprietary network architectures. Example architectures include telecommunications network architectures such as: the 3GPP LTE (Third Generation Partnership Project Long Term Evolution) network architecture; 3GPP LTE-Advanced architecture; the GSM architecture, including GPRS (General Packet Radio Service) and EDGE (Enhanced Data for Global Evolution); the WCDMA architecture, including UMTS (Universal Mobile Telecommunications System) and HSPA (High-speed Downlink Packet Access); the CDMA-2000 (Code Division Multiple Access—2000) architecture; and the EVDO (Evolution Data Optimised) architecture.

In the example shown in FIG. 1, an air interface network (also known as a terrestrial radio access network (RAN)) 100 is illustrated together with a network core 200. In the present examples, the air interface network 100 typically comprises a plurality of nodes (also known as base stations). In the example of FIG. 1, the air interface network 100 comprises a first node 102, a second node 104, a third node 106, and a fourth node 108, although it will be appreciated that the air interface network 100 could comprise any suitable number of nodes. In the present examples, the nodes handle radio-interface related functions.

In the example of FIG. 1, the radio access network 100 also comprises a user equipment (UE) device 110, such as a mobile telephone, although it will be appreciated that a user equipment device 110 could be any suitable device including, for example, telephones, pagers, messaging appliances, personal computers and tablets. The user equipment device 110 (which, for example, may be operated by a human user or by a machine element) is operable to communicate wirelessly with one or more of the nodes 102, 104, 106, and 108. Although only one user equipment device is illustrated in FIG. 1, it will be appreciated that the air interface network 100 could comprise any suitable number of user equipment devices.

The network core 200 comprises a first management entity 202 and a second management entity 204, although it will be appreciated that any suitable number of management entities could be used. In examples, the management entities 202 and 204 are operable to manage functions such as mobility for tracking, paging, roaming, handovers, control and signalling functions for managing access of the user equipment devices to network connections, and session and subscriber management and the like. In some examples, all of these functions are carried out by a unitary management entity and in other examples these functions are divided between circuit management and packet management entities. In the present examples, each node or management entity is operable to communicate with one or more other nodes or management entities as indicated by the dotted lines in FIG. 1 according to known techniques.

Each management entity is associated with a serving entity and a packet data network entity. The serving entity of each management entity serves to delineate the air interface network from core networks and is operable to maintain data paths between nodes and a respective packet data network entity. In other words, the serving entity can be thought of as an interface between the air interface network 100 and a packet data network. The packet data network entity of each management entity can be thought of as a node which delineates the packet data network interface from packet data networks, such as the Internet. The air interface network 100 and the network core 200 cooperate together to facilitate operation of the network, for example according to defined standards and so will not be described in further detail herein.

In the present examples, each node is associated with a respective cell which corresponds to a physical area in which one or more user equipment devices may communicate with that node. Many factors may affect the performance of a cell and the performance of a cell may be measured in different ways. Factors which may influence the performance of a cell include the physical location of the node and its environment, number of user equipment devices within the cell which are communicating with the node, data capacity of the node and the like.

In the specific examples of the network architecture being a 3GPP LTE (Third Generation Partnership Project Long Term Evolution) or 3GPP LTE-Advanced architecture (variously 3.9G, 4G technologies), the air interface network would be an Enhanced Universal Terrestrial Radio Access Network (E-UTRAN) and the network core would be an Evolved Packet Core (EPC) 200. Further, the nodes of the air interface network would be Enhanced Node Bs (eNBs or eNodeBs) and the management entities would be Mobility Management Entities (MMEs). Each MME would be associated with a Serving Gateway (S-GW) and a Packet Data Network (PDN) Gateway (P-GW). In this example, the serving entity would be an S-GW and the packet data network entity would be a P-GW. In this example, an interface between an eNB and an MME is referred to as an S1 interface, which allows communication between an eNB and an MME, for example as described according to 3GPP LTE. In this example, an interface between an eNB and another eNB is referred to as an X2 interface, which allows communication between eNBs, for example as described according to 3GPP LTE.

In the examples of the network architecture being a GPRS-based architecture such as GSM, GPRS/EDGE, WCDMA or UMTS/HSPA (variously 2G, 2G transitional, 2.5G, 2.75G, 3G, 3G transitional, 3.5G, 3.75G technologies), the air interface network would be the radio network interface elements from GSM (or other TDMA) or CDMA air transport architecture, and the network core would be the GPRS Core Network in combination with the circuit switched network core elements from the GSM (or other TDMA) or CDMA architecture. The packet switching functions of the management entities (including the serving entities and packet data network entities) would be provided variously by the Gateway GPRS Support Node (GGSN) and Serving GPRS Support Node (SGSN). The inter-node and node-management entity interfaces would be selected from the available interfaces provided under the relevant air interface network architecture.

Thus there has now been described a schematic example of a mobile communications network, including examples of how that schematic example could be implemented using existing mobile communications network architectures.

The skilled reader will also appreciate that other network architectures exist. These may include wired communication channels, wireless communication channels or a mixture of both wired and wireless channels. Such architectures can include relatively simple arrangements such as IP (internet protocol) over Ethernet, and more complex arrangements such as ATM over PDH over Packet using Pseudowires or optical communication.

An example of a method for optimising a self organising network will now be described with reference to FIG. 2. In general, the purpose of the method for optimising a self organising network is to provide one or more recommendations based on measurements of the network which are intended to improve the performance of the network for example.

In examples, source data from OMC performance monitoring systems and sub-cell data sources such as trace data, probe data, and event data from core network devices such as a Home Location Register (HLR), Mobile Switching Centre (MSC), Serving GPRS Support Node (SGSN), Policy Control and Charging Rules Function (PCRF), is used to assess performance of managed objects as Information Object Classes (IOC) of types Cell, and/or Cell Relationship), and sub-network (e.g. sub-cell) objects as referred to in this disclosure as parts of a cell. This will be described in more detail below.

Figure 2:
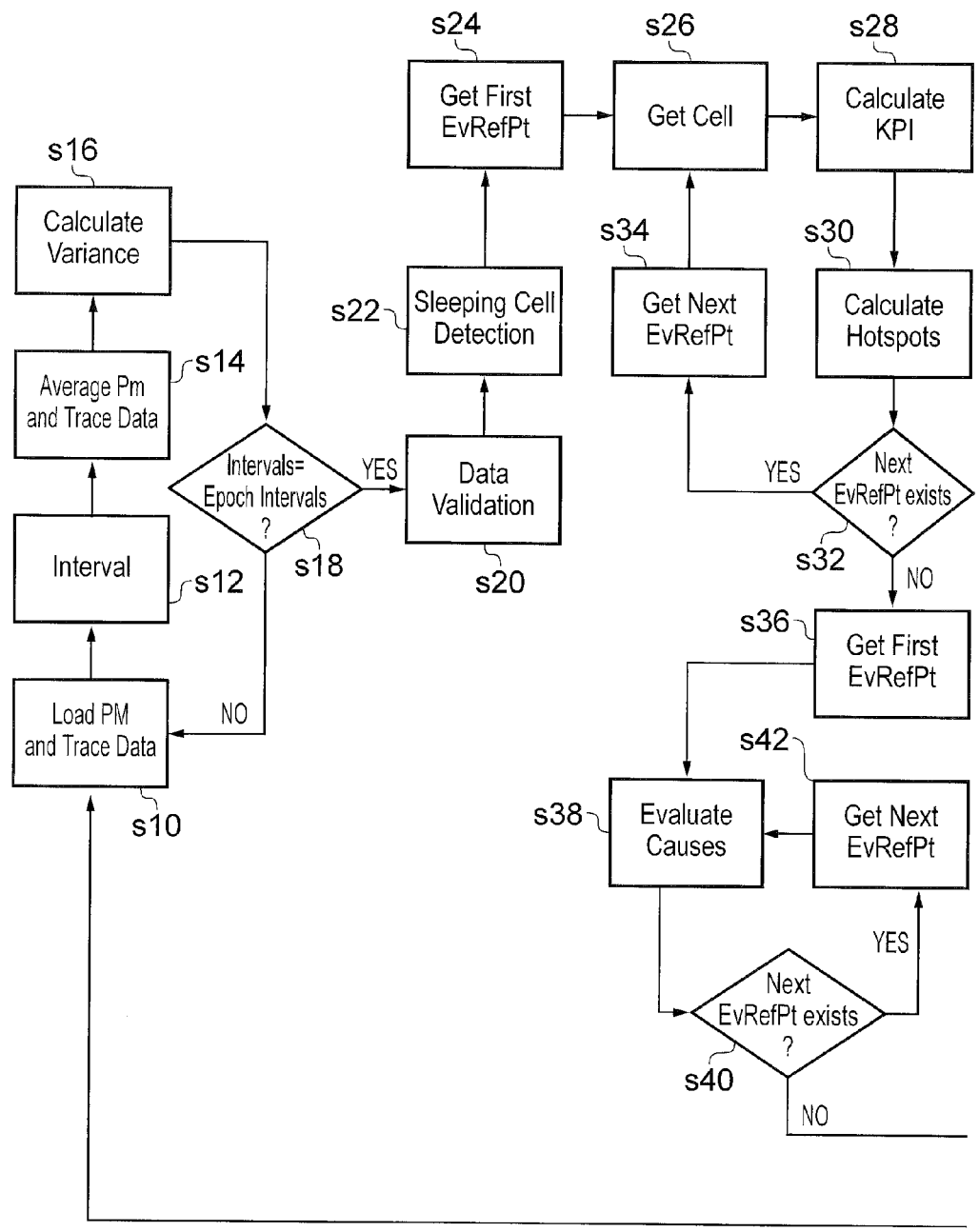
FIG. 2 is a schematic diagram of an example optimisation method.
Figure 2:
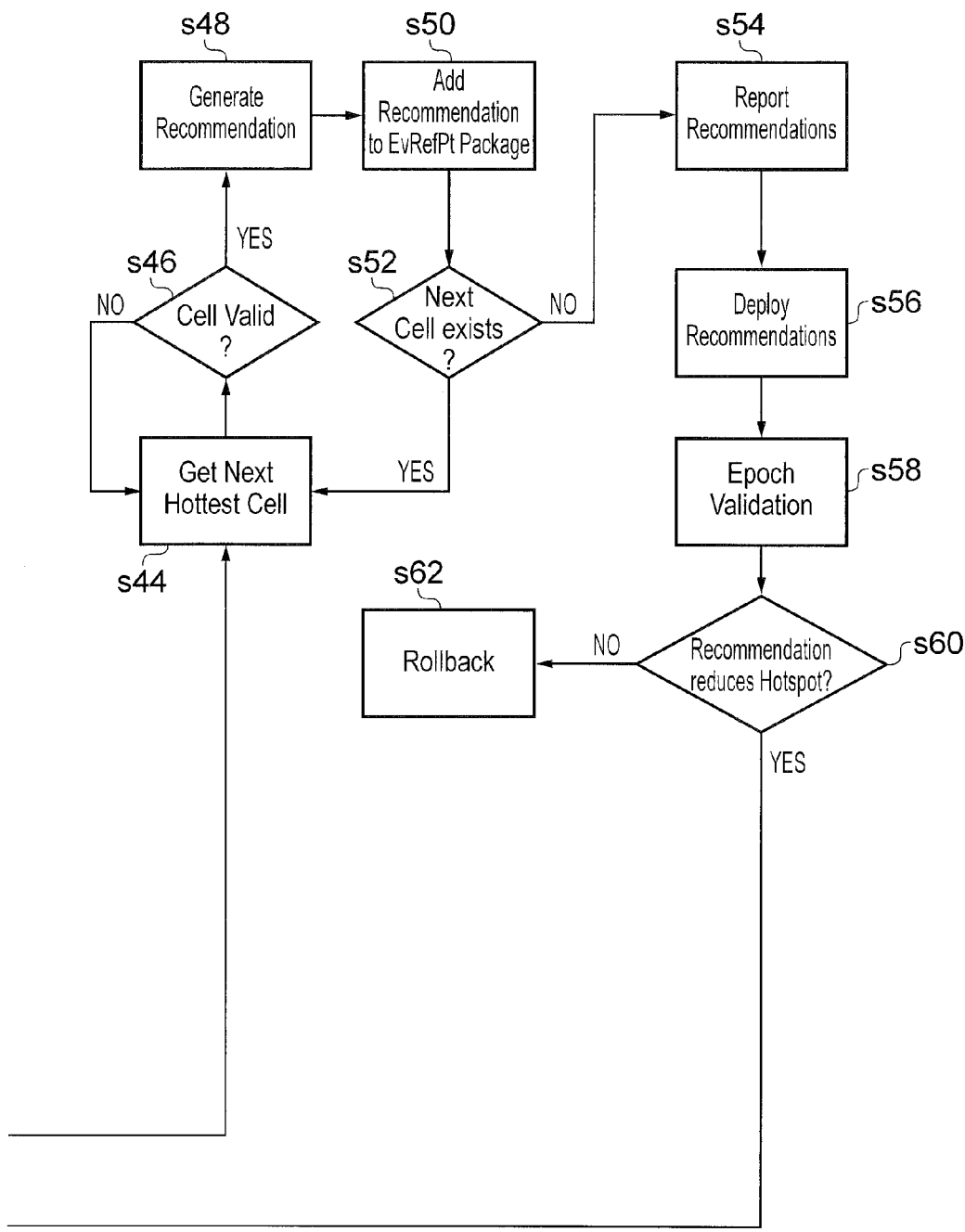

FIG. 2 is a flowchart of a method of network optimisation according to the present disclosure. Examples of the techniques described herein can help provide an improved coverage and capacity optimisation system and method.

At a step s10, performance management (PM) data and trace data are loaded into a computer system for carrying out network optimisation. In other words, in examples, monitoring of the performance measurement data and monitoring of the trace data is carried out at the step s10. In examples, a user selects, via a suitable user interface, which cells of the network should be assessed using the method of FIG. 2. For example, those cells selected by the user are considered to correspond to a group of cells of the network. However, it will be appreciated that the group of cells could be selected automatically. In examples, the group of cells comprises all of the cells in the network. In examples, the group of cells comprises cells selected by a user. In some examples, a group of cells comprises cells grouped according to a 3GPP mobility area such as location area, routing area, tracking area, or a custom area. However, it will be appreciated that the group of cells may comprise any group of cells, for example as customised by a user according to specific optimisation requirements. In some examples, a group of cells is termed a segment (cluster). In examples, a segment comprises one or more areas (for example one or more 3GPP mobility areas, although it will be appreciated that other areas could be used).

In examples, the performance management data provides information regarding the state (e.g. performance) of the network at the cell level. In other words, each cell of the network has associated performance management data. In examples, the performance management data is indicative of performance of one or more cells in a group or segment of cells in the network.

Where a mobile operator operates several different generations of mobile technology, performance management data for each technology is loaded (imported) into the computer system. For example, a mobile operator might operate a GERAN (Global System for Mobile Communications (GSM) Enhanced Data Rates for GSM evolution (EDGE) Radio Access Network), a UTRAN (Universal Terrestrial Radio Access Network) and a EUTRAN (Enhanced Universal Terrestrial Radio Access Network). An example of types of performance management objects data which, in examples, is associated with performance management data for these networks is given in table 1 below, which shows examples of mobile performance objects (performance management objects).

TABLE 1

Mobile Performance Objects

| Type | GERAN | UTRAN | EUTRAN |
|---|---|---|---|
| Cells | GeranCell | UtranCellFDD | EUtranCellFDD |
| Mobility Areas | LA, RA | LAC, RA | TA |
| Mobile Devices | MS | UE | UE |
| Neighbour Relations | GeranRelation | UtranRelation | EUtranRelation |

Examples of the types of performance management data associated with the mobile performance objects shown in table 1 are illustrated in table 2 below.

TABLE 2

Mobile Performance Data

| Type | GERAN | UTRAN | EUTRAN | Source |
|---|---|---|---|---|
| Handovers | HHO | SofterHO SHO HHO | HO Switch | PM |
| MR | MR | MR | MR | Trace |
| Protocol Data | Fields | Fields | Fields | Trace |
| Radio Connections | RC | RRC | RRC | PM |
| Radio Links | RL, RB, Ch | CE | PRB | PM |
| Radio Bearers | RB | RB | DRB | PM |
| Load | Bps, Frames | Bps, Frames | Bps, Frames | PM | where the following acronyms are used:

Bps—Bits per second;
Block—A frame of data of N bits length;
CE—Channel Elements;
DRB—Data Radio Bearer;
Frames—A variable frame of data of N bits length;
HHO—Hard Handover;
MR—Measurement Report;
MS—Mobile Station;
LA—Location Area—Group of between 3 and Nx100 cells defined for the purposes of mobility management for GSM and UMTS;
OMC—Operations and Maintenance Centre;
PRB—Physical Resource;
PM—Performance Monitoring data collected from the Operations and Maintenance Centre, connected to the mobile network;
RB—Radio Bearer;
RC—Resource Control;
RL—Radio Link;
RA—Routing Area—A group of between 3 and Nx100 cells defined for the purposes of mobility management for GPRS and UMTS-Packet Domain;
RRC—Radio Resource Control;
Softer Handover (SofterHO)—Handover between two cells on the same base station
SHO—Soft Handover—A connection that comprises a plurality of radio links (RLs) to different cells and which is arranged to update connection properties by adding and dropping RLs from a group of cells currently supporting the connection (collectively called the Active set in UMTS/CDMA);
Source—a physical element and/or data source in the network from which the Performance management data is obtained;
TA—Tracking Area—A group of between 3 and Nx100 cells defined for the purposes of mobility management for LTE, for example, although it will be appreciated that the group could comprise other numbers of cells;
Trace—A system that collects a copy of protocol data used during a call for the connection supporting that call; and
UE—User Equipment.

It will be appreciated that other suitable performance management data may be used as appropriate for different mobile technologies. It will also be appreciated that the performance management data may be loaded for use in the optimisation algorithm for one or more networks technologies. For example, performance management data for a UTRAN and/or a EUTRAN may be loaded for use in the optimisation algorithm, although performance management data for any number of network technologies could be used as appropriate.

More generally in examples, the performance management data is monitored for one or more of: network level; base stations associated with the cells in the group; subgroups of cells in the group; cells in the group; and neighbour relationships between cells.

In some examples, the trace data provides information regarding the performance (e.g. state) of the network at a sub-cell level. In examples, the trace data is indicative of traffic statistics within the cells of the group. In examples, the traffic statistics comprise geographical traffic statistics, although it will be appreciated that other traffic statistics could be used. In examples, the trace data comprises live performance data which is complementary to performance management (PM) data from a connected Operations and Management Centre (OMC) generated, for example, using known techniques.

Performance management data from an OMC typically provides performance data from the objects managed by the OMC (e.g. a cell), but typically does not provide performance data about functionality within the object (e.g. a cell in the network). For example, performance management data from an OMC could relate to a cell and a neighbour relation (for example, two cells), but the performance data would not include data relating to performance within the cell. Therefore, in examples, performance management data on a sub-cell level is also monitored. The trace data according to examples of the disclosure therefore comprises information regarding the performance of functionality within a cell, for example on a sub-cell basis.

Therefore, in example techniques of the disclosure, performance management data (for example from an OMC) is used in combination with trace data (for example sub-cell level performance data) to provide monitoring and optimisation of a network on a network, cell, and sub-cell level. In example techniques, sub-cell performance data is used to provide measurement report (MR) data and 3GPP/3GPP2 (3rd Generation Partnership Project 2) protocol data so as to improve a geo-location accuracy of a UE device's geo-located position (e.g. by GPS). In examples, MR data and supplemental geo-location data (such as 3GPP/3GPP2 protocol data) is provided to the optimisation system with a geo-location accuracy of between 1 m and 300 m, although it will be appreciated that other suitable geo-location accuracies could be used. In examples of the techniques of the disclosure, a trace system is used to obtain the trace data. In examples, the trace system is operable to provide measurement reports at one or more of a radio signal strength level, connection level, link level, and RB/RAB (Radio Bearer/Radio Access Bearer) level. In examples, the measurement reports are generated by monitoring data of mobile devices (e.g. UE devices) in the network (traced mobile devices, for example UE devices for a UMTS or LTE technology network) and monitored to determine the data for those devices. In some examples, the data obtained by the trace system is compared with a priori information generated by the optimisation system based on planned input data (i.e. data that is intended to be used by the optimisation system). For example, trace data is generated on a mobile device (for example, a UE device) connection basis.

In the examples described herein, the term "receive" in the context of a UE device, is taken to mean communication of the UE device with a cell to decode and recover user plane data for a service that the UE device (mobile) has agreed with the mobile network. In examples, the term "coverage" is typically taken to mean a situation in which a UE device (mobile) can receive from a cell. In the examples of the disclosure, the boundary of a cell is taken to be defined by a physical contour from the centre of the cell and which a UE device can still receive from that cell for a given service agreement with the mobile network. In other words, for example, the boundary of the cell is defined by the edge of a physical area for which the UE device has coverage.

In examples, the sub-cell data comprises RF (radio frequency) measurement data indicative of whether a UE device can receive from a cell that a network designer would expect that UE device to be able to receive from. In examples, if the RF measurement data indicates that the UE device can receive from the cell, then optimisation is unlikely to be required. However, if, for example, the RF measurement data indicates that the UE device cannot receive from the cell in a situation in which it would be expected to be able to receive, then it is likely that optimisation will be required. This can often be because the UE device is registering a cell that is overshooting its design boundaries rather than a cell which the UE device is intended to be communicating with.

Therefore, in examples, the optimisation system is operable to use the trace data (comprising sub-cell performance data) to detect one or more of the following conditions:
i. a good reception condition in which the sub-cell performance data is within a good reception threshold (for example as indicated by RF signal strength data) of a good reception value for a cell planned (e.g. intended by a network designer) to provide coverage at a UE device's current location;
ii. a poor reception condition in which the sub-cell performance data is within a poor reception threshold of a poor reception value (for example as indicated by RF signal strength data) for a cell planned (e.g. intended by a network designer) to provide coverage at a UE device's current location;
iii. a cell overshoot condition in which the sub-cell performance data is within a good reception threshold of a good reception value (for example as indicated by RF signal strength data) for a cell which has not been planned (e.g. intended by a network designer) to provide coverage at a UE device's current location, that is for a cell which should not provide coverage at the UE device's current location; and
iv. a cell overlap condition in which two or more cells are providing coverage to a UE device at the current position of the UE device to within a threshold performance level at the cell boundaries of the cells.

In some examples, each cell is divided into geographical segments and the trace data generated for each geographical segment. This will be described in more detail later below. In some examples, the trace data provides an indication of traffic within a cell. In other words, in some examples, the trace data comprises traffic statistics of a cell and each cell has respective trace data. In some examples, trace data is generated by decoding radio resource event messages and generating geo location data from signal strength and time correction data for each trace using known techniques.

The use of a trace system to provide trace data in accordance with example techniques of the disclosure can advantageously provide sub-cell data on a per UE device (e.g. mobile device) basis to establish sub-cell performance coverage so that the trace data can be used in optimising the network according to the example techniques. However, the use of trace data tends to require the use of large memory resources. For example, a typical size for trace data generated from a few calls (e.g. <5 calls) and for a few minutes (e.g. <5 minutes) is 120 MByte, although it will be appreciated that the trace data could have any size as appropriate.

Therefore, in examples, HLR/CGW (Home Location Register/Cellular Gateway) call event logging is used to selectively filter the trace data so that only trace data from UE devices which provide sub-cell performance data which meets one or more sub-cell performance data criteria is processed by the optimisation system. In other words, the optimisation system is operable to detect which trace data meets a performance criteria for its associated UE device and use the trace data which meets the performance criteria for network optimisation. In other words, in examples, it is detected which trace data meets a performance criteria for an user equipment device in the network, and the trace data detected as meeting the performance criteria is monitored.

In some examples, the optimisation system is operable to detect which UE devices have a call rate greater than a call rate threshold and use the trace data for those UE devices for optimising the network. In other words, for example, a performance criteria for network optimisation is which UE devices have a call rate greater than a call rate threshold, although it will be appreciated that other performance criteria could be used. In this example, the trace data for those UE devices which meet the performance criteria is used for optimising the network.

Therefore, in examples, monitoring the trace data comprises monitoring the trace data for those user equipment devices which are detected as having a call rate greater than a call rate threshold. In other words, for example, UE devices (mobiles) which have a call rate less than the call rate threshold (and thus likely to have trace data less than a trace data content threshold) can be ignored. This can help reduce the amount of trace data that needs to be processed to generate an optimisation recommendation for a current optimisation time period (for example an epoch, as discussed later).

In some examples, the optimisation system is operable to detect which cells in the group are active cells based on the trace data for those cells and to generate recommendation data for those cells in the group which are detected as being active. In some examples, trace data for UE devices which are detected as having a call rate greater than the call rate threshold (referred to herein as active users) is monitored more frequently than trace data for UE devices which are detected as having a call rate less than the call rate threshold (referred to herein as idle users). Idle users generate signalling data (and hence trace data) less frequently than active users and so user plane data from idle users tends to be less useful than that of active users when generating recommendations according to the example optimisation techniques.

In examples, the trace data comprises one or more of the following:
- radio connection data relating to a number of radio connections between the mobile and the radio access network;
- anonymous mobile reference data relating to the number of UE devices with active traffic;
- number of radio bearers and bit rate volume of radio bearers per connection per QofS descriptor;
- number of radio access bearers and bit rate volume of radio access bearers per connection per QoS descriptor;
- traffic load data relating to uplink and downlink traffic load per discernable QoS;
- bit rate throughput data relating to throughput bit rate per QoS; and
- signalling load data relating to signalling load.

Here, QoS stands for Quality of Service. QoS may be differentiated by class or as part of a defined QoS class as defined in the appropriate radio access networks standard protocol for the telecommunications technology being considered (e.g. 2G, 3G, LTE etc.). In examples, the optimisation system is operable to distinguish between, for example, a so-called "conversational call/session" and a so-called "best efforts/interactive" call/session based on QoS descriptor data generated from the sub-cell data.

In examples, the sub-cell data is typically protocol reference indexed or mobile reference indexed and typically provided with the QoS type as one of the reported information elements or can be derived from sub-cell performance tag data using known techniques. In examples, mobile reference index data comprises one or more of: IMSI (International Mobile Subscriber Identity) data; URid (UTRAN Registration Identity) data; and TMSI (Temporary Mobile Subscriber Identity) data, although it will be appreciated that other identity data could be used. In examples, protocol reference index data comprises one or more of: Protocol Procedural ID data; Protocol Stream ID data; and Protocol Tunnel ID data although it will be appreciated that other ID (identity) data could be used. In examples, identity data of traced protocols is used to identify trace data associated with a particular mobile device (for example, a UE device) from different traced protocols.

It will be appreciated that the trace data could comprise other suitable data or parameters. In examples, the above data as described with respect to the trace data may be decoded from traffic statistics according to one or more of per trace, per cell and per group of cells. In other words, in examples, the trace data is monitored for one or more of: base stations associated with the cells in the group; sub-groups of cells in the group; cells in the group; and sub-cell regions of cells in the group.

In examples of the disclosure, geo location of traces is carried out using signal strength and signal quality using known techniques. To help improve accuracy of geo location data, in some examples, geo location data generated from signal strength data and signal quality data is modified (for example, by applying a correction factor) based on time corrections from the trace data. For example, Timing Advance data for GSM or LTE and Code Offset for UMTS may be used to modify the geo location data. As another example, 3GPP UE Position Reporting Content or other more static GIS (Geographic Information Service) such as data from Google maps or DGPS data (Differential Global Positioning System data) may be used to enhance the accuracy of the geo location data using known techniques such as:

i) differential correction by association with Wi-Fi known positions from a content provider such as Google;
ii) differential correction by association with known feature positions from Mapping data;
iii) differential time corrections from DGPS; and
iv) direct latitude and longitude value reporting from a Geo-Location application running on the UE device (mobile) and reported using the UE-Location-Reporting method according to the 3GPP standard (3GPP Technical Specification 32.500, Rel-10, version 10.1.0, available 8 Oct. 2010).

However, it will be appreciated that other techniques could be used to improve the accuracy of the geo location data as appropriate.

With reference to FIG. 2, at a step s12, time interval data is incremented (increased) by a predetermined period of time. In examples, the predetermined period of time is 15 minutes, although it will be appreciated that any other time interval could be used (for example, 5 minutes, 10 minutes, 30 minutes, 45 minutes etc.). For example, the value of the time interval data (time interval value) when the algorithm is initiated is set to zero, although it will be appreciated that any other suitable value could be used. In examples, the predetermined period of time corresponds to a first periodic time interval, and monitoring of the performance management data and the trace data is carried out at a first periodic time interval.

At a step s14, once the predetermined period of time has elapsed, the mean average of the performance management data and trace data is calculated, and the variance calculated at a step s16. Then, at a step s18, it is determined if the time interval data has the same value as an epoch interval value. The epoch interval value is a time period at which the network optimisation algorithm is to be executed (for example carried out by a computer system or the like). In example, the epoch interval value is 60 minutes, although it will be appreciated that the epoch interval value could be any other value such as 90 minutes, 120 minutes, 150 minutes, 180 minutes and the like. In examples, the epoch interval value corresponds with at a second periodic time interval which is longer than the first periodic time interval. In examples, the second periodic time interval is an integer multiple of the first periodic time interval. In examples, modification of the attribute of the network is carried out at the second periodic time interval.

If, at the step s18, the value of the time interval data (e.g. first periodic time interval) is the same as the epoch interval value (e.g. second periodic time interval), then processing proceeds to a step s20. However, if the value of the time interval date is not the same as the epoch interval value then processing proceeds to the step s10.

In some examples, if the epoch interval value is the same as the time interval value, then at the step s18, the time interval value is reset to the initial value (e.g. time interval value=0).

However, in other examples, the time interval value is not reset. In these examples, it is determined at the step s18 whether the time interval value is divisible by an integer number of epoch interval values, and if so, the processing proceeds to the step s20. If the time interval value is not divisible by an integer number of epoch interval values, then processing proceeds to the step s10.

In other words, the steps s10 to s18 are executed every time interval value (e.g. every 15 minutes) up until the epoch interval value (e.g. 60 minutes). In the example of the time interval value=15 minutes, and epoch interval value=60 minutes, then there will be four sets of performance management data and trace data (60/15=4) which are averaged together at the step s14. However, it will be appreciated that any number of data sets of PM data and trace data could be used. In examples, a mean average is calculated at the step s14, although it will be appreciated that the modal and/or median average could also be determined at the step s14. In some examples, a rolling average is calculated at the step s14. For example, after the elapse of two time interval values (e.g. 2×15 minutes=30 minutes) the average of 2 data sets is calculated (one data set loaded at t=0, one data set loaded at t=15 minutes) Similarly, for example, after a time period corresponding to three time interval values, 3 data sets will be averaged. However, it will be appreciated that the average could be calculated in other suitable ways.

At the step s20, a data validation process (a "Data Validation" process) is carried out on the PM data. In examples, the data validation process uses variance data generated at the step s16 to determine whether a cell and/or group of cells should be used when generating a recommendation. In examples, the variance is compared to a threshold variance value. If the variance for a cell or group of cells is greater than the threshold variance value, then that cell or group of cells is not used for generating a recommendation. If, for example, the PM data has a high variance (e.g. the variance is greater than the threshold variance value), this suggests that network traffic is changing significantly over the time period of the epoch interval value.

In other words, cells or groups of cells which have a high degree of changing traffic (e.g. the variance is greater than the threshold variance value) are likely to be loaded inconsistently and therefore are unlikely to be suitable for generating a recommendation for improving the operation of the network. In other words, in examples, it is detected if the performance management data indicates performance of a cell is within a predetermined range and, if not, the performance management data for that cell is disregarded (for example by flagging that cell as invalid).

In some examples, each cell or group of cells is associated with flag data indicative of whether or not the cell or group of cells is invalid (i.e. whether it should be used for generating a recommendation). If, for example, the variance of the PM data for a cell or group of cells is greater than the threshold variance value, then the flag data for that cell or group of cells is set to "invalid". In other words, in examples, it is detected if a variance in the performance management data over a validation period of time is greater than a performance management data threshold level, and if so that performance management data is disregarded (for example, by setting the flag data for the cell to "invalid"). In some examples, it is detected if a variance in the trace data over a validation period of time is greater than a trace data threshold level, and if so that trace data is disregarded (for example, by setting the flag data for the cell to "invalid").

In examples, a cell or group of cells is flagged as invalid if one or more of the following criteria are satisfied:
  cells and/or base stations for which PM is not available;
  number of cells per area is greater than a maximum cells per area threshold;
  number of cells per area is less than a minimum cells per area threshold;
  cell occupancy is less than a cell occupancy threshold;
  number of handover (HO) attempts is greater than a number of HO preparation operations; and
  number of handover (HO) attempts is greater than a HO attempts threshold.

It will be appreciated that other suitable conditions may be used to determine whether a cell or groups of cells should be used to make a recommendation.

At a step s22, a sleeping cell detection operation is carried out. In this context, a sleeping cell should be understood to mean a cell that is detected from the performance management data and/or sub-cell monitoring as being unresponsive. In other words, the optimisation system is operable to determine is a cell is "sleeping" if the cell meets one or more of the following conditions:
  i) the Cell's last reported Configuration Management and Network Resource Model data is still reporting that the Cell is "Operational" and not in an "Administrative state"
  ii) The PM system is reporting that no PM data has been reported for the <Last_N> periods as compared to a previously known time when the cell did report performance data—in examples, the <Last_N> periods corresponds with one or more PM Intervals or one or more Epoch time periods, although it will be appreciated that other suitable time periods could be used; and
  iii) The PM system is reporting that the cell has not passed any user plane data for the <Last_N> periods—in examples, the <Last_N> periods corresponds with one or more PM Intervals or one or more Epoch time periods, although it will be appreciated that other suitable time periods could be used.

In examples, whether a cell is a sleeping cell may also be detected using known techniques based on analysis of HLR (Home Location Register) data, although it will be appreciated that other suitable methods may be used to detect whether a cell is sleeping.

In examples, if a cell is detected as being a sleeping cell, then that cell is not used further in generating a recommendation. In some examples, PM data and trace data for those cells that are detected as being sleeping cells is ignored and excluded from further data processing, at least up until the generation of a current recommendation. In other words, in some examples, only trace data from active cells is used for the generation of a recommendation. This can help reduce the amount of data that is needed to be processed in order to generate a recommendation, thus helping to reduce the processing resources needed to generate a recommendation which can help speed up the generation of a recommendation. In other words, more generally, the step s22 can be thought of as detecting which cells in the group are active cells based on the trace data for those cells. The techniques of the present disclosure can therefore help facilitate detection of sleeping cells. In examples, recommendation data is generated for those cells in the group which are detected as being active.

The generation of key performance indicators (KPIs) and calculation of hotspots according to examples of the present disclosure will now be described with reference to steps s24, s26, s28, s30, s32, and s34 of FIG. 2.

At the step s24, data for a first evaluation reference point (EvRefPt) is obtained. In examples, an evaluation reference point corresponds to one or more of:

i. a cell or a group of cells;
ii. a "segment" group of "areas" or cells defined by a user;
iii. an "area"—for example a group of cells defined as a 3GPP mobility area such as Location Area (LA), Routing Area (RA) or Tracking Area (TA);
iv. a base station for supporting a number of cells within a predetermined number range all supported by the same base station equipment—in examples, a base station supports between 1 and 6 cells (i.e. predetermined number range=1 to 6), although it will be appreciated that a base station could support any appropriate number of cells and that different base stations could support different numbers of cells; and
v. a sub cell segment—in examples, a sub-cell segment of cell coverage corresponds to an arc of a circle of coverage of N degree from true north from <X1> meters from a cell centre to <X2> meters from the cell centre, where X2>X1, in steps of <Y> meters.

The use of sub-cell segments will be described in more detail later below. Following the step s24, processing continues to the step s26.

At a step s26, data for a cell corresponding to the evaluation reference point under consideration is fetched. For example, data necessary for calculating one or more KPIs at the step s28 is obtained at the step s26. In examples, the key performance indicators for each cell in the group are processed so as to generate a respective hotspot value for each cell in the group of cells specified by the user (or selected automatically). The generating of hotspot values will be described in more detail later below.

Following the step s26, processing proceeds to the step s28.

At the step s28 one or more KPIs are calculated, based on the data obtained at the step s26. In examples, a plurality of KPIs are calculated, for example according to equations 1-5 as described below. More generally, in examples, step s28 relates to generating, from the performance management data and the trace data, a plurality of key performance indicators each indicative of performance of an aspect of a cell in the group.

In examples, (for example relating to LTE) a first KPI is the percentage of available slots occupied by a UE and is calculated according to equation 1.

$$UELoad = \frac{DrbUEActiveA}{EUtranCellMaxUE \times NoCarriers} \times 100 \quad \text{Equation 1}$$

where:
DrbUEActiveA is the mean average number of uplink (UL) and downlink (DL) UE devices that have queued data across all the Quality of Service Class Identifiers (QCI) per cell; EUtranCellMaxUE is the maximum number of UEs allowed in a cell per 5 MHz carrier; and NoCarriers is the number of 5 MHz carriers on the cell.

In examples, a second KPI is calculated according to equation 2.

$$UELoad = \frac{DrbUEActiveAMax}{EUtranCellMaxUE \times NoCarriers} \times 100 \quad \text{Equation 2}$$

where DrbUEActiveAMax is the maximum number of UL and DL UE devices that have queued data across all the QCIs per cell and EUtranCellMaxUE and NoCarriers are as defined above for equation 1.

In examples, a third KPI is the percentage of UL physical resource block (PRB) used and is calculated according to equation 3.

$$ULPRBUsed = \frac{RRUprbUlAUsed}{RRUprpUlAAvail} \times 100 \quad \text{Equation 3}$$

where: RRUprbUlAUsed is the mean average number of uplink PRBs in use, in a cell; and RRUprbUlAAvail is the available number of uplink PRBs for use, in a cell.

In examples, a fourth KPI is the percentage of DL physical resource block (PRB) used and is calculated according to equation 3.

$$DLPRBUsed = \frac{RRUprbDlAUsed}{RRUprbDlAAvail} \times 100 \quad \text{Equation 4}$$

where: RRUprbDlAUsed is the mean average number of downlink PRBs in use, in a cell; and RRUprbDlAAvail is the available number of downlink PRBs for use, in a cell.

In examples, a fifth KPI is the ERAB (EUTRAN Radio Access Bearer) setup failure rate per QCI and is calculated according to equation 5.

$$ERABFailureRateQCIx = \left(1 - \frac{ErabEstabAddSuccNbrx + ErabEstabInitSuccNbrx}{ErabEstabAddAttNbrx + ErabEstabInitAttNbrx}\right) \times 100 \quad \text{Equation 5}$$

where: ERABFailureRateQCIx is the ERAB setup failure rate per QCI; ErabEstabAddSuccNbrx is the number of ERAB additional establishment successes per QCIx; ErabEstabInitSuccNbrx is the number of ERAB initial establishment successes per QCIx; ErabEstabAddAttNbrx is the number of ERAB additional establishment attempts; and ErabEstabInitAttNbrx is the number of ERAB Initial establishment attempts.

It will be appreciated that other KPIs may also be used. For example, an RRC connection failure and ERAB setup success rate may be calculated according to known techniques, although it will be appreciated that other suitable techniques and KPIs could be used.

In examples, one or more KPIs are calculated for each cell associated with the evaluation reference point under consideration. However, it will be appreciated that one or more cells could be used to generate the KPIs at the step s28. Following the step s28, processing proceeds to the step s30.

At the step s30, a hotspot value for the evaluation reference point under consideration is calculated. In examples, the hotspot value is calculated based on KPI types and weightings for each group type. More generally, in examples, s30 can be considered to correspond to processing the key performance indicators so as to generate a hotspot value indicative of general performance of the a cell in the group.

In examples, a hotspot value is calculated based on SON KPI values for the cell or group of cells associated with the evaluation reference point. In examples, the SON KPI types are arranged into two groups. A first group is a connection group and a second group is a data group. An example of SON KPI types and their respective groups is shown in table 3 below.

TABLE 3

| SON KPI Type | Group |
| --- | --- |
| RRC Connection Failure | Connection |
| UE Load | Connection |
| DRB Usage | Data |
| Total ERAB usage | Data |
| ERAB 1 Usage | Data |
| ERAB 5 Usage | Data |
| ERAB 9 Usage | Data |
| PRB Usage Uplink | Data |
| PRB Usage Downlink | Data |
| Used PRB Bits | Data |

In table 3 above, the following terminology is used:

EPS—Evolved Packet System (commonly referred to as LTE), defined in 3GPP specification documentation (3GPP Technical Specification 36.300, Rel-10, version 10.5.0, available 3 Oct. 2011 and 3GPP Technical Specification 36.410, Rel-10, version 10.2.0, available 27 Sep. 2011)

DRB usage=The number of Dedicated Radio Bearers (DRB) used in comparison with DRB resources allocated at the base station; and Total ERAB usage=The number of EPS Radio Access Bearers (ERAB) used in comparison with ERAB resources allocated at the base station.

In examples relating to LTE (as defined in 3GPP Technical Specification 36.300, Rel-10, version 10.5.0, available 3 Oct. 2011 "General E-UTRAN Description" and 3GPP Technical Specification 36.410, Rel-10, version 10.2.0, available 27 Sep. 2011, "S1 General Principles"), ERABs are specified in terms of specific QoS Class Identifiers (QCI) 1 to 9 (i.e. ERAB(1) to ERAB(9)). In the example illustrated in Table 3, QCI1, QCI5, and QCI9 are considered which relate to Conversational Voice, IMS signalling and Best Efforts Data respectively. However, it will be appreciated that the KPI techniques described could use other QoS monitoring profiles and be applied to other radio technologies (for example UMTS, in which 4 QoS classes are defined).

In examples, PRB Usage uplink and PRB Usage Downlink are calculated using equations 3 and 4 respectively, although it will be appreciated that PRB Usage uplink and PRB Usage Downlink may be calculated using other suitable methods.

The example shown in table 3 relates to LTE and illustrates SON KPIs for 3 of the 9 possible QoS classes defined in the LTE specification (3GPP Technical Specification 36.300, Rel-10, version 10.5.0, available 3 Oct. 2011 and 3GPP Technical Specification 36.410, Rel-10, version 10.2.0, available 27 Sep. 2011) traffic load assessment. However, it will be appreciated that technologies other than LTE could be used and that different specific numbers of classes to be monitored at any one time could be used as appropriate to the to configuration of the optimisation method.

Although Table 3 gives an example of the use of two group types, it will be appreciated that one or more group types could be used. In other words, a plurality of group types could be used. Alternatively, only one group type may be used.

In examples, the KPI values for each group type and for each cell are summed together and weighted according to a weighting factor. The weighted summation is divided by the number of KPIs in the group.

An example of a method for calculation a hotspot value is given in equation 6.

$$HsValue = \frac{W_{Con} \times \sum_{1}^{N_{Con}} KPI_{Con}}{N_{Con}} + \frac{W_{Data} \times \sum_{1}^{N_{Data}} KPI_{Data}}{N_{Data}}$$ Equation 6 where: HsValue is the hotspot value; $W_{Con}$ is a connection group weight; $N_{Con}$ is the number of KPIs in the connection group; $KPI_{Con}$ is the SON KPI value for a KPI type in the connection group; $W_{Data}$ is a data group weight; $N_{Data}$ is the number of KPIs in the data group; and $KPI_{Data}$ is the SON KPI value for a SON KPI type in the data group.

In examples, the hotspot value for an evaluation reference point is compared with one or more hotspot reference values and classified according to the relationship of the hotspot value with respect to the hotspot reference values. In other words, "hotspot" can be thought of as providing a "health check" measure.

For example, two hotspot reference values may be used, a first hotspot reference value HSref1, and a second hotspot reference value HSref2, although it will be appreciated that any number of hotspot reference values could be used. In examples, the hotspot reference values are used to classify the evaluation reference points in order of "hotness". Cells associated with evaluation reference points that are determined to be "hotter" are more likely to be in need of optimisation. In these examples, the greater the hotspot value, the more likely it is that the cell(s) is not performing correctly. In other words, the hotspot reference values can be used to determine whether there are any problems with the evaluation reference points and how severe the problems are.

In examples, HSref1>HSref2 although it will be appreciated that the hotspot reference values could have any relationship (for example HSref1<HSref2). In some examples, ranges defined by the hotspot reference values are referred to by colours indicating their degree of "hotness". In examples, the hotspot reference values define three ranges—red, amber (yellow) and green—for example as shown in table 4 below.

TABLE 5

| Range Colour | Hotspot value range |
| --- | --- |
| Red | HSValue ≥ HSref1 |
| Amber | HSref1 > HSValue ≥ HSref2 |
| Green | HSref2 > HSValue |

It will be appreciated that any number of ranges could be defined as appropriate based on the number of hotspot reference values used. For example, if HSValue>HSref1, then the cell(s) of the evaluation reference point would be considered to be performing poorly (e.g. in the red range). In contrast, if HSref2>HSvalue, then the cell(s) of the evaluation reference point would be considered to be performing satisfactorily (e.g. in the green range).

Once the hotspot value for the evaluation reference point under consideration has been calculated at the step s30, processing proceeds to the step s32.

At the step s32, it is determined if another (next) evaluation reference point exists. If so, then processing proceeds to the step s34 in which data for the next evaluation reference point is obtained in a similar manner to that described above for the step s24. Processing passes from the step s34 to the step s26. However, if, at the step s32, there are no further evaluation reference points to process then processing passes to the step s36. In other words, the steps s26, s28, s30, s32, and s34 execute in a loop for each evaluation reference point until there are no more evaluation reference points to consider. For example, where a network comprises 100 evaluation reference points (e.g. number of evaluation reference points NumEvRefPt=100), the steps s26 to s34 would execute 100 times, although it will be appreciated that the number of evaluation reference points NumEvRefPt could take any value for example depending on the size of the network, processing resource available, level of detail required for generating a recommendation and the like.

Referring to FIG. 2, the step s36 together with a step s40 and a step s42 are carried out to determine possible causes of cell(s) of an evaluation reference point to be performing in such a way as to generate the associated hotspot value and its relationship with the hotspot reference values (e.g. possible causes for the hotspot value of an evaluation reference point to fall within the red, amber, or green range). More generally, in examples, the hotspot value is compared with a threshold hotspot value (e.g. HSref1), and if the hotspot value is greater than the threshold hotspot value, attribute data (e.g. performance management data for the cell and/or performance management data for neighbour relation cells) of the cells in the group is processed so as to generate cause data indicative of a cause attributed to the hotspot value exceeding the hotspot threshold value;

At a step s36, data for the first evaluation reference point of the plurality of evaluation reference points is obtained. Then, at a step s38, possible causes for the generation of a particular hotspot value for that evaluation reference point are assessed.

In examples, operation of cell(s) associated with the evaluation reference point are assessed, for example, by examining performance management data and neighbour relation management (NRM) data. In an example, a UE load on a cell is compared with a UE load threshold value. If the UE load on the cell is greater than the UE load threshold value, then the performance management (PM) data for that cell is examined. In an example, the number of handover attempts from the cell to each neighbour relation (NR) cell is calculated according to equation 7.

$$NRHandoverAtt = (HoOutAttDrxTarget + HoOutAttTarget)$$ Equation 7 where: NRHandoverAtt is the number of handover attempts to a neighbour relation cell; HoOutAttDrxTarget is the number of attempted handovers with Discontinuous Reception (DRX) (e.g. according to the 3GPP standard); and HoOutAttTarget is the number of attempted handovers (e.g. according to the 3GPP standard). The number of neighbour relation handover attempts NRHandoverAtt is compared with a value of an active neighbour relations minimum handover attempts (ActiveNRMinHRAttempts) threshold. If NRHandoverAtt<ActiveNRMinHRAttempts, then the neighbour relation is not considered to be sufficiently active. In other words, for this case, there are too few active neighbour relations. If, for example, the number of active neighbour relation cells is less than a low neighbour relation (NR) threshold, then the cause of the hotspot value for that cell is attributed to a lack of active neighbour relations.

In some examples, the performance management data for a cell is analysed to determine whether the UE devices are located within a threshold distance of the edge of a cell (for example at or near the edge of the cell). If the percentage of UE devices in cell within the threshold distance of the edge is greater than a threshold percentage, then the cause of the hotspot value for that cell is considered to be localised overload of the cell.

As a further example, if the percentage of UE devices in a cell within the threshold distance of the edge is less than the threshold percentage, then the cause is attributed to adjacent cell overload.

In another example, it is determined if a cell or cells associated with the evaluation reference point is subject to RRC connection failure greater than a threshold number of times within a predetermined period. If so, then the base station processor is analysed to detect if the processor load exceeds a processor load threshold. If the processor load exceeds the processor load threshold, then the cause is determined to be processor overload. If the processor load does not exceed the processor load threshold, then the cause is attributed to Signalling Radio Bearer (SRB) overload on the cell itself.

In an example, if NRHandoverAtt>ActiveNRMinHRAttempts, then the cause is attributed to the coverage area of the cell being too large.

Although examples of determining causes have been given, it will be appreciated that other suitable methods of determining causes for the performance of a cell or cells may be used as appropriate.

Returning to FIG. 2, once one or more causes have been determined at the step s38, processing proceeds to the step s40.

At the step s40, it is determined if the next evaluation reference point exists. If so, then processing proceeds to the step s42 and the next evaluation reference point is obtained at the step s42 in a similar manner to the step s36. If the next evaluation reference point does not exist (i.e. all evaluation reference points have been processed according to steps s38, s40 and s42), then processing proceeds to a step s44.

At steps s44, s46, s48, s50, and s52, one or more recommendations for optimising the network are generated based on evaluating one or more cells in the network. In the example shown in FIG. 2, the steps s44, s46, s48, s50, and s52 are arranged to process the cells in the order of decreasing hotspot value. In other words, a cell having the highest hotspot value is processed first, with a cell having the next highest hotspot value being processed next, and so on, with a cell having the lowest hotspot value being processed last. However, it will be appreciated that the cells could be processed in any appropriate order, for example in order of increasing hotspot value.

More specifically, at a step s44, a cell which has not yet been processed according to any of the steps s46, s48, s50, and s52 and which has the highest hotspot value is determined and data for this cell obtained. In other words, a cell with the highest (hottest) hotspot value is determined from among the cells yet to be processed for generating one or more recommendations and is designated as the cell for processing.

Then, at a step s46, it is determined if the cell for processing is valid. In examples, the validation data (e.g. flag data) generated at the step s20 is used to determine if the cell for processing is valid. For example, if the flag data for the cell for processing is set to "invalid", then that cell is determined to be invalid.

If the cell is not valid (i.e. cell valid?=No), then processing proceeds to the step s44 and data for the cell with the next highest (hottest) hotspot value is obtained. If the cell is valid (i.e. cell valid?=yes, for example as indicated by the flag data for that cell), then processing proceeds to the step s48.

At the step s48, one or more recommendations are generated for the cell. In examples, the recommendations are based on causes, for example as determined at the step s38. More generally, in examples, recommendation data for modifying an attribute of the network is generated from the cause data, for example as described below with reference to the step s48. In examples modifying an attribute of the network comprises one or more of: modifications to the RET of one or more base stations of one or more cells; modification of the power of one or more base stations of one or more cells; alteration of neighbour lists; and physical modifications (e.g. upgrades) of the physical network. However, it will be appreciated that other modifications to attributes of the network could be made.

In an example, if a cell is detected as being overloaded (for example as described above based on analysis of RRC connection failure), then a recommendation is generated to direct UE devices away from the cell which is overloaded to one or more neighbour relation (NR) cells. In some examples, the cell is analysed to determine whether one or more conditions are satisfied, and if so an appropriate recommendation is generated based on the one or more conditions. Examples of conditions and associated recommendations are given below in table 5. In Table 5, the recommendation is generated if the condition is satisfied (i.e. condition=TRUE)

It will be appreciated that other conditions and recommendations could be used. For example, recommendations could include modifications to the RET of one or more base stations of one or more cells, modification of the power of one or more base stations of one or more cells, alteration of neighbour lists, and physical modifications (e.g. upgrades) of the physical network.

In some examples, recommendations are generated based on causes and conditions as indicated by a recommendation database comprising the causes and/or conditions together with one or more associated recommendations. In other words, the recommendations database is indicative of a mapping between a cause and/or condition and one or more recommendations associated with the cause and/or condition. In some examples, the computer system is arranged to allow a network optimisation engineer to access the data in the recommendation database. For example, the network optimisation engineer may wish to check that the recommendations are current, or analyse problems which may occur when applying a particular recommendation.

In some examples, recommendations are generated for each evaluation reference point, with each evaluation reference point corresponding to a cell. However, in other examples, an evaluation reference point corresponds to any other monitoring object associated with performance management data and sub-cell data (e.g. from trace data), such as a cell, base station, mobility area, network segment (group of cells), or whole network, with recommendations being made for each cell comprising the object evaluated. In some examples, each evaluation reference point is assigned a group of recommendations, referred to as a recommendations package (evaluation reference point package). In some examples, an evaluation reference point has only one recommendations package generated for it. However, in other examples, an evaluation reference point can have more than one recommendations package associated with it, for example, if there are several different recommendations could be made in response to the same cause. In other words, in examples, generating the recommendation data comprises generating a recommendation package which comprises recommendation data generated for each cell in the group of cells. In some examples, a plurality of recommendation packages are generated, and the attribute of the network modified in accordance with a recommendation package selected by a user, for example as will be described in more detail later below.

In examples, recommendations are generated so that conflicting recommendations are not included in the same package. For example, a recommendation to increase the power of a base station of a cell would be considered to conflict with a recommendation to physically remove that base station from the network.

TABLE 5

| Condition | Recommendation |
|---|---|
| Cell has a horizontal beamwidth of 360 degrees | Split cell |
| No NR cells | Add new cell |
| Cell has neighbour relation (NR) cells whose respective cell hotspot values are less then the first hotspot reference value (e.g. HSvalue < HSref1) AND the NR cells have not had any recommendations applied to them AND the NR cells have not reached their power limit | Increase reference power of one or more NR base stations for one or more cells |
| Valid NR cells have reached their respective power limits | Decrease RET (Remote Electrical Tilting) of one or more NR base stations for one or more cells |

In other words, when generating recommendations according to some of the present examples, cell load is assessed. If, for example, the hotspot value of the cell exceeds the first hotspot threshold (HSValue>HSref 1 e.g. the cell is "hot"/"red") due to traffic overload, then NR cells are examined. In some examples, a high, medium, low classification assessment is made per hotspot value, although it will be appreciated that other classifications could be used such as traffic lighting (e.g. red, amber, green classification) could be used.

Where suitable, the RET and power of the BR cells is modified to make them more favourable (or less favourable if necessary) to the "hot" cell. In some examples, NR cells are assessed for viability (i.e. their ability to act as a usable NR cell) using known techniques and if an NR cell is determined not to be viable, then a recommendation is made to remove that NR cell. If, for example, it is determined that removal of an NR cell will not modify the hotspot value for the "hot" cell then a recommendation is made to modify (e.g. upgrade) the physical resources of the "hot" cell.

Returning to FIG. 2, at the step s50, the recommendation(s) generated at the step s48 are included in the evaluation reference point package. In other words, in examples, the evaluation reference point package (recommendation package) comprises a plurality of recommendations which may be implemented with the intention of improving optimisation of the network.

In examples, each recommendation package has an associated confidence value and an associated impact value.

The confidence value indicates the likelihood that deployment of the package will improve the optimisation of the network. For example, a confidence value of 1 (100%) indicates that deployment of the package will definitely improve network optimisation. As another example, a confidence value of 0.1 (10%) indicates a 10% likelihood that deployment of the package will improve network optimisation. However, it will be appreciated that any other suitable confidence value or method for indicating likelihood of the package improving the operation of the network could be used.

The impact value indicates the number of cells that deployment of the package will affect. In example, the impact value directly indicates the number of cells (i.e. impact value=number of cells affected). For example, an impact value of 1 indicates that one cell would be affected and an impact value of 10 indicates that 10 cells would be affected by deployment of the package, although it will be appreciated that other values could be used and associated in other appropriate ways with the number of cells which would be affected. It will also be appreciated that the impact value could be used to indicate other aspects of the network which could be affected, for example, geographical coverage.

For example, the confidence value and the impact value allow a network operator (for example a network optimisation engineer) to assess whether to deploy a package.

At the step s52, it is determined whether there are cells which have not yet been processed using steps s46, s48, and s50. In other words, it is determined at the step s52 if a next cell exists. If there is a cell(s) which has not yet been processed, then processing proceeds to the step s44 and data for the cell with the next highest hotspot value is obtained. However, if all the cells have been processed (i.e. next cell exists=No), then processing proceeds to a step s54.

At the step s54, the recommendations generated at the step s54 are reported to the network operator. In examples, there are two modes of operation, semi-manual operation and automatic operation, although it will be appreciated that any number and different modes of operation could be used.

In examples, in semi-manual operation mode, appropriate recommendation data is sent to a user's computer system operated by a network optimisation engineer. The network optimisation engineer can then assess whether to deploy the recommendations of the package. Where there is more than one recommendations package, a network optimisation engineer may select, via a suitable user interface, which recommendations package they wish to deploy.

In examples, in automatic operation mode, recommendation data is sent to an OMC/Antenna Control System so that the operation of the network can be modified in response to the recommendation data automatically.

Alternatively, in some examples, recommendations are reported to a recommendations assessment unit.

In examples, the recommendations assessment unit it operable to determine whether to deploy a package based on the confidence value and/or the impacts value. In an example, the recommendations assessment unit compares the confidence value and the impact value for a package to a respective confidence value threshold and impact value threshold. If the confidence value is greater than the confidence value threshold and the impact value is greater than the impact value threshold, then the recommendations assessment unit generates data indicating that the package should be deployed. However, it will be appreciated that other methods for assessing whether a package should be deployed could be used.

For example, assessment may be based only on the confidence value or only on the impact value, although it will be appreciated that other suitable data indicating the likelihood that the package will improve the network operation could be used. In examples, if there is more than one recommendations package, then the assessment unit selects the package with the highest confidence value, although it will be appreciated that the assessment unit could select a package in other ways such as: selecting the package with the lowest impact value; selecting the package with the highest confidence value and the highest impact value; selecting the package with the highest confidence value and the lowest impact value, although it will be recognised that other methods for selecting which package to deploy could be used.

Following the step s54, processing then proceeds to a step s56. At the step s56, the recommendations are deployed in the network. In examples, one or more aspects of the network operation and/or physical attributes of components of the network are modified based on the recommendations in the package. More generally, in examples, an attribute of the network is modified based on the recommendation data.

Then, at a step s58, the recommendations deployed at the step s56 are evaluated to determine whether they improve the operation of the network. In other words, an evaluation (validation) of the deployed recommendations is carried out. In examples, validation of recommendations is carried out once per epoch value (epoch time period), for example once every 60 minutes, although it will be appreciated that any other time period could be used.

In examples, the operation of the network is said to have improved if one or more hotspot values are reduced by deployment of the package. Therefore, at a step s60, it is determined if the recommendation package reduces one or more hotspot values. In examples, the hotspot value is calculated using the process described above with reference to the step s30, although it will be appreciated that the hotspot value could be calculated in other ways. In some examples, the hotspot value is calculated only for those cells which have been modified by a recommendation. This can help reduce processing resources needed to validate (evaluate) a deployed recommendation package because the hotspot value is less likely to change for cells which have not been modified. However, modification of one cell may affect the operation of another cell and so in other examples the hotspot value is calculated for each cell in the network.

In examples, steps s58 and s60 can be thought of as "epoch validation". In some examples, recommendation data generated by the optimisation system is stored in a recommendation database together with time data indicative of when a recommendation was used to modify an aspect of the network. Therefore, in some examples, recommendation data from the recommendation database may be used to modify the network at times as indicated by the time data. The example techniques of the disclosure can thus help provide diurnal and sub-diurnal optimisation of the network so that the network can be modified to take into account differences in user traffic over the network as it varies with time (e.g. over the course of a day).

In some examples, a user can set a limit on the extent of modification to be suggested in a recommendation. In other words, for example, a recommendation to modify an aspect of the network (e.g. cell, cells, base station and the like) is limited to within user defined limits. More generally, in examples, modification of the attribute of the network is limited to less than a threshold modification level (such as those defined by a user). This can help reduce the likelihood that too large a change is applied to the network when the recommendation is deployed, which may cause it to become unstable.

If the recommendation(s) does not reduce the hotspot value, then any settings or attributes of the network that were modified by deployment of package are reset (rolled back) at a step s62 to the setting before the recommendation package was deployed. In some examples, epoch validation data is generated and stored in a recommendations evaluation database indicating whether and/or by how much the hotspot value(s) is changed with respect the hotspot value before deployment of the recommendations package. This can help improve selection of recommendations for future iterations of the optimisation process, because recommendations which have been shown to increase the hotspot value can be ignored. Therefore, in examples, if a recommendation has been shown by a deployed package to increase the hotspot value or hotspot values of one or more cells, then the recommendation is removed from the recommendations database. Alternatively, the recommendation may be flagged as being likely to increase the hotspot value. Accordingly, for example, this data can be used to generate the confidence value and/or the impact value.

More generally, in examples, the computer system determines if the modification of the attribute of the network based on the recommendation data improves the operation of the network, and, if not, the attribute of the network is modified to remove the modification that was based on the recommendation data. As mentioned above, the hotspot value may be used to determine if the modification improves the operation of the network. In other words, in examples, the computer system detects if the hotspot value for a cell under consideration is greater after modification of the attribute of the network than the hotspot value for that cell before modification of the attribute of the network, and if so, generates data indicating that the performance of the network has not improved. For example, this data can then be used to determine if the network settings (e.g. attribute of the network) should be rolled back (reset) to the setting before the modification based on the recommendations package.

However, if the recommendation package when deployed decreases the hotspot value(s) for the evaluation reference point, then processing returns to the step s10.

In some examples, a user may select which packages to deploy. However, in other examples, which packages to be deployed are selected automatically. For example, the ten packages having the highest confidence values from among the recommendations packages may be automatically selected and deployed each new algorithm execution period (epoch time period).

In examples, monitoring the trace data comprises monitoring sub-cell performance data. In examples, a processing order indicative of an order of cells for which attributes should be modified is determined from hotspot values generated for the group of cells (for example steps s30 and s44 of FIG. 2). In examples, the processing order is arranged so that each cell in the group is listed once in the processing order (for example, if at the step s52 of FIG. 2 there are no cells to process, processing proceeds to the step s54). In examples, generating the recommendation data (e.g. at the step s48 of FIG. 2) comprises generating the recommendation data sequentially according to the processing order (for example steps s44 to s52 of FIG. 2).

As mentioned above, in examples, trace data is generated per base station, per group of cell, per cell, and per sub-cell segment (per sub-cell region). In examples, a sub-cell segment corresponds to a portion of the cell smaller than the area covered by the cell. In examples, a sub-cell segment of cell coverage corresponds to an arc of a circle of coverage of N degree from true north from <X1> meters from a cell centre to <X2> meters from the cell centre, where X2>X1, in steps of <Y> meters. In an example, each N=15 degrees with distance groups q as given below:

| | |
|---|---|
| q = 1 | 0 m to 100 m; |
| q = 2 | 100 m to 200 m; |
| q = 3 | 200 m to 500 m; |
| q = 4 | 500 m to 1000 m; and |
| q = 5 | >1000 m. |

However, it will be appreciated that X1, X2, Y and N could take any other appropriate value. In examples, the trace data for each cell in the group is monitored for a plurality of sub-cell regions of each cell, the sub-cell regions being smaller than an area of the respective cell. In some examples, the sub-cell regions are smaller than an area of the respective cell on a per UE device (mobile device) basis.

Figure 3:
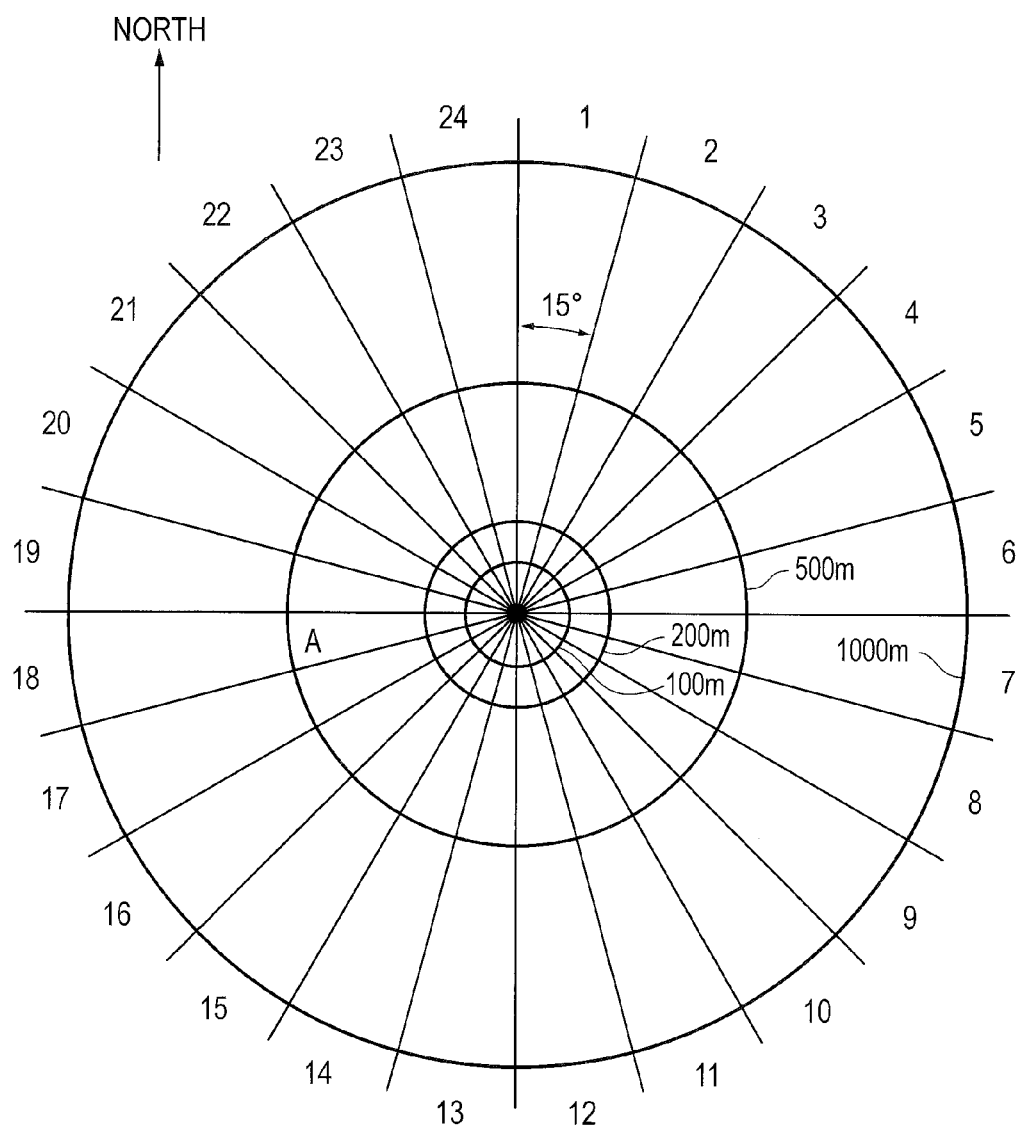
FIG. 3 is a schematic diagram of example sub-cell segments.

An example division of a cell into sub-cell segments is illustrated schematically in FIG. 3.

FIG. 3 shows a schematic diagram of a plurality of sub-cell segments according to an example of the present disclosure.

In the example shown in FIG. 3, N=15 degrees and the distance ranges are as defined above. In the example shown in FIG. 3, the segments are numbered with segment indicating numbers p in a clockwise direction from north. As N=15 degrees there are 24 segment indicating numbers (360/15=24). In examples, a segment is referenced according to its segment indicating number and its distance group, with the segment indicating number p being given first and the distance group second, although it will be appreciated that the segments could be indexed in any other suitable manner. For example, a segment (18, 3) correspond to a segment 'A' as indicated in FIG. 3

It will also be appreciated that the cell could be divided in any other way, such as into sub-cell portions, where each portion is smaller than an area of the sub-cell. In some examples, a sub-cell portion corresponds to a sub-cell segment. In examples, cells are divided into sub-cell segments, for example as described with respect to FIG. 3. In examples, the optimisation system is operable to detect in which direction a cell overlaps with other adjacent cells for neighbour analysis using techniques such as those described above with respect to cell overlap.

In some examples, sub-cell direction of selected traces is performed by using active cell driving stimulated by a suitable external source such as an HLR which is used to drive the Trace system to be able to select active call traces. As mentioned above, at the step s22, sleeping cells are detected. In examples, sleeping cells are detected based on the trace data generated for one or more sub-cell segments of the cell.

In examples, in order to help decrease execution time of the optimisation algorithm and help provide scalability, each network provided by a network operator (e.g. GSM, 3G, 4G etc) is divided into portions referred to as chunks. In examples, a chunk comprises one or more evaluation reference points, although it will be appreciated that the chunks could comprise any other suitable sub element of the network such as a group of cells (e.g. arranged by geographical area). In examples, each chunk can be processed independently in parallel by respective processing elements (e.g. calculation engines, processors, and the like). In examples, each processing element is arranged to execute the method described with respect to FIG. 2. In some examples, the optimisation system is operable to automatically allocate a data for plurality of cells (segments) to respective processor according to available processing resources. The data for each segment can then be processed in parallel. This can help improve the scalability of the optimisation system.

An example of a computer system for implementing the examples described herein will now be described with reference to FIG. 4.

Figure 4:
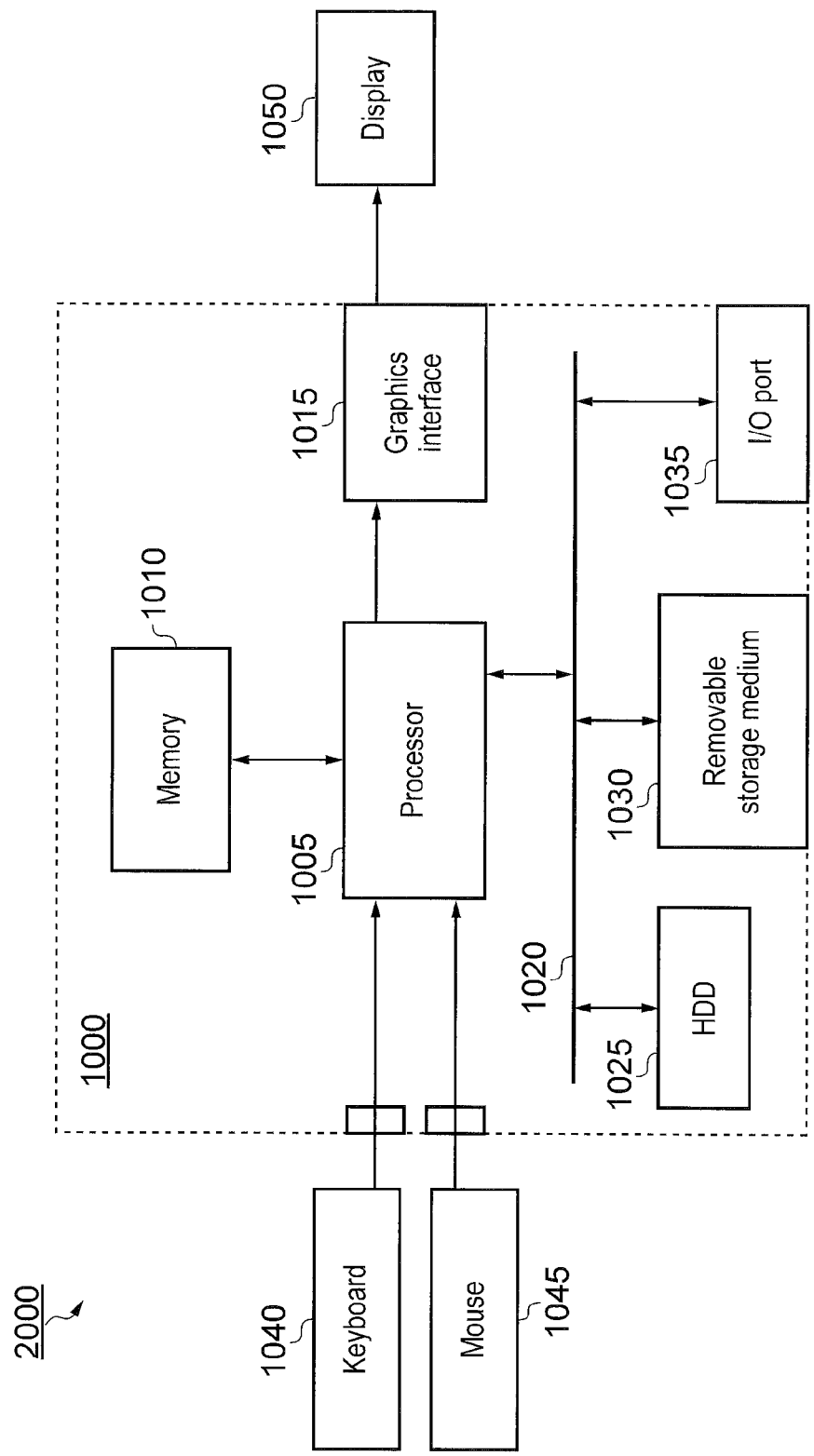
FIG. 4 is a schematic diagram of an example computer system.

FIG. 4 schematically illustrates a computer system 2000. The computer system 2000 comprises a system unit 1000, and a plurality of peripheral devices. The system unit 1000 comprises: a processor 1005; a memory 1010; a graphics interface 1015; a data bus 1020; a hard disc drive (HDD) 1025; a removable storage medium drive 1030; and an input/output (I/O) port 1035. The peripheral devices comprise a keyboard 1040; a mouse 1045; and a display 1050.

The processor 1005 is operable to receive control signals from the keyboard 1040 and mouse 1045 so as to control operation of the system unit 1000. However, it will be appreciated that other suitable input devices may be used to control operation of the system unit 1000 such as a track ball, touch input device (e.g. in cooperation with the display 1050), and the like.

The processor 1005 is operable to communicate bidirectionally with the hard disc drive 1025, removable storage medium 1030, and input/output port 1035 via the data bus 1020. In some examples, the removable storage medium is a DVD-ROM although it will be appreciated that other suitable removable storage media such as CD-ROM, CD-R, CD-RW, DVD-R, DVD-RW, Blu-ray disc, memory stick, and the like could be used. Software for controlling the system unit may be stored on the HDD 1025 and/or the removable storage medium 1030 in accordance with known techniques.

The input/output port 1035 is operable to allow the system unit to communicate with one or more peripheral devices, such as a printer, scanner, memory stick, and the like, although it will be appreciated that any suitable peripheral device could be used. In some examples, the input/output port 1035 comprises a universal serial bus (USB) port for communicating according to a USB protocol. However, it will be appreciated that the input/output port 1035 could comprise any other suitable interface (wired or wireless e.g. IEEE 1394, IEEE802.11, ethernet and the like) and allow the system unit 1000 to communicate according to any suitable protocol. In some examples (not shown), the system unit comprises a network interface (wired or wireless) for communicating with a network such as the internet or a local area network (LAN), although any suitable network interface could be used.

In examples, the input/output port 1035 can enable functionality similar to that of the graphics interface 1015. In examples, the input/output port 1035 is operable to communicate with a device configured to act as a graphics interface having one or more display screens and a user control interface, such as a laptop computer device, desktop computer device, tablet PC device, mobile communication device (e.g. a UE device), although it will be appreciated that other devices could be used. In examples, the input/output port 1035 is operable to communicate via the internet with the device configured to act as a graphics interface device, although it will be appreciated that other suitable communication protocols could be used.

The processor 1005 is operable to write data to and/or read data from the memory 1010 according to known techniques so as to allow the processor 1005 to implement instructions to control operation of the system unit. In some examples, the memory 1010 comprises dynamic random access memory (DRAM) although it will be appreciated that any other suitable form of memory could be used.

The processor 1005 is operable to generate graphics data and communicate the graphics data to the graphics interface 1015. In response to the graphics data generated by the processor 1005, the graphics interface is operable to generate control signals to control the display of the graphics data on the display 1050.

In some examples (not shown), the system unit 1000 comprises an audio interface and the processor 1005 is operable to generate audio data to cause the audio interface to output the audio data to a suitable audio reproduction device, such as one or more loud speakers, headphones and the like, although it will be appreciated that any other suitable audio reproduction device could be used.

Although FIG. 4 shows an example of a general purpose computer which may be used to implement the examples described herein, it will be appreciated that other suitable general purpose computers could be used to implement the described examples.

An example of a network optimisation system will now be described with reference to FIG. 5.

Figure 5:
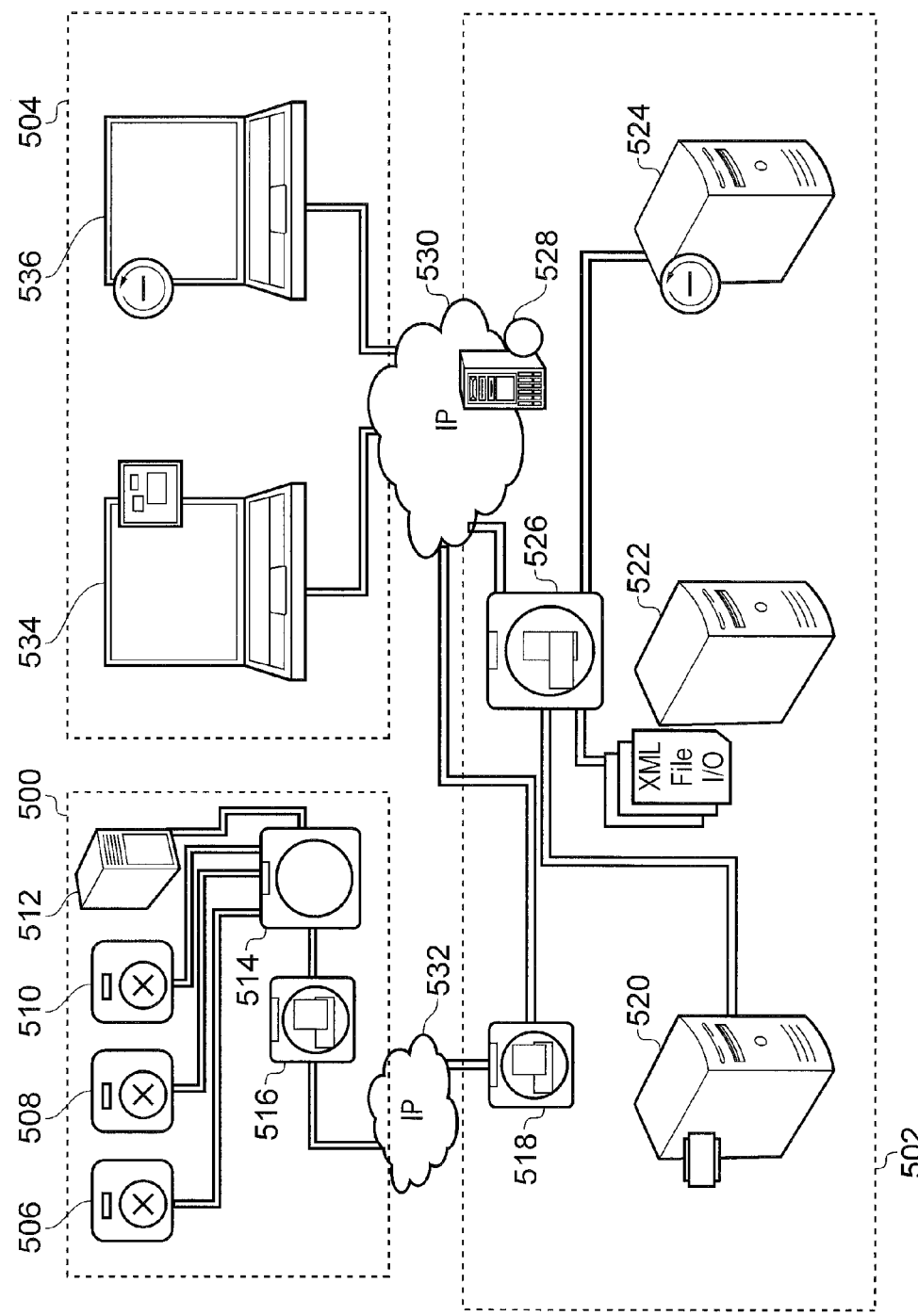
FIG. 5 is a schematic diagram of an example network optimisation system.

FIG. 5 is a schematic diagram of an example network optimisation system. In examples, the network optimisation system comprises a user network 500, an optimisation processing section 502, and a user control system 504. The user network 500 comprises a plurality of network interface elements 506, 508, 510 for obtaining data such as trace data and performance management data from a telecommunications network (such as that described with respect to FIG. 1), a data management server 512, a user network hub 514, and a user network firewall element 516.

The network interface elements 506, 508, 510 and data management server 512 are operable to communicate with the hub 514 via ethernet, although it will be appreciated that other suitable communication techniques could be used. For example, the user network 500 could comprise a plurality of routers, switches and hubs and other devices arranged to communicate with each other via an internet protocol to provide the functionality of the user network 500, although it will be appreciated that other network arrangements and communication protocol could be used. The data management server 512 is operable to manage the data obtained by the network interface elements and communicate with the hub 514 via a suitable file transfer protocol (ftp), although it will be appreciate that other communication protocols could be used. In examples, the network interface elements 506, 508, 510 are operable to obtain trace data and performance management data for use at the step s10 as described with respect to FIG. 2. The hub 514 is operable to communicate with the firewall element 516 via ethernet, although it will be appreciated that any other communication technique could be used.

The optimisation processing section 502 comprises an optimisation section firewall element 518, an EWS (Enterprise Data Service for interworking with planning and OSS tools) application server 520, a database server 522, an ESS (Enterprise SON Service) application server 524, an optimisation section hub 526, and a web server 528.

The web server 528 is operable to act as a server for an intranet network 530 and is operable to communicate with the hub 526 via ethernet, although other communication techniques could be used.

The optimisation section firewall element 518 is operable to perform a firewall function and communicate using internet protocol (IP) with the user network firewall 516 via a network connection 532 such as the internet or a virtual private network (VPN) connection, although it will be appreciated that other communication techniques could be used. The optimisation section firewall element 518 is operable to communicate with the intranet network 530 using internet protocol (IP), although it will be appreciated that other communication protocols could be used.

The EWS application server 520 is operable to communicate with planning and operations support systems of the telecommunications network (such as that described with respect to FIG. 1), for example via an IP network connection, although it will be appreciated that other types of network connection could be used. The EWS application server 520 is also operable to communicate with the hub 526. For example, data handled by the EWS application server 520 can be communicated to one or more of the database server 522, ESS application server 524 and the intranet network 530 via the hub 526.

The database server 522 is operable to store database data and communicate with the hub 526 via ethernet although it will be appreciated that other communication techniques could be used. In examples, the database server 522 is operable to store a database of recommendation data, for example recommendation data as described above, although it will be appreciated that the database server 522 could store other data for use in optimising the telecommunication network in accordance with the techniques of the disclosure. The ESS application server 524 is operable to communicate with the hub 526 via ethernet, although it will be appreciated that other communication techniques could be used.

The user control system 504 comprises an enterprise client device 534 and an ESS web client device 536. The ESS web client device 536 is operable to act as a user interface device for a network optimisation engineer and is arranged to cooperate with the ESS application optimisation section 502 and the user network 500 via the intranet network 530 so as to implement the optimisation techniques of the disclosure. In examples, the ESS web client device 536 acts as a web front end (WFE) browser based client. In examples, the user network 500 and the optimisation processing section 502 can be thought of as a back-end services oriented architecture (SOA) for implementing the techniques of the disclosure.

The enterprise client device 534 is operable to provide software functionality that enables a user to interact with the back-end services oriented architecture implementing the optimisation techniques of the disclosure, for example provided by the user network 500 and the network optimisation section 502, via a suitable user interface (e.g. mouse, keyboard, touch screen and the like) within a web browser. The enterprise client device 534 can be thought of as a web front end (WFE) and, in examples, can provide similar functionality to the ESS web client device 536, although it will be appreciated that the enterprise client device 534 could provide the same or different functionality from the ESS web client device 536.

In examples, the ESS application server 524 is operable to cooperate with the database server 522 and EWS application server 520 via the hub 526, and the network interface elements (506, 508, 510) and the user network server 512 via the hub 526, intranet network 530, firewall element 518, network connection 532, firewall element 516 and hub 514 so as to implement the optimisation techniques of the disclosure. In examples, the ESS application server 524 is operable to provide a plurality of optimisation services comprising: an algorithm service (ESS-A); a coordination engine service (ESS-E); a source data collection service (ESS-S) for collecting (obtaining) source data such as the performance management data and the trace data for use in optimisation of the telecommunications network; a results data management service (ESS-R) for managing results such as recommendations generated by the optimisation algorithm; and a presentation service for communication between the ESS-R and the WFE.

In examples, the source data collection service (ESS-S) is operable to obtain the performance management data and the trace data (for example according to steps s10 to s18 of FIG. 2) for use in the optimisation algorithm from the network interface elements 506, 508, 510, although it will be appreciated that the performance management data and trace data could be obtained using other suitable techniques. Additionally, it will be appreciated that the source data collection service (ESS-S) could obtain other data necessary for implementing the optimisation techniques of the disclosure.

In examples, the algorithm service (ESS-A) is operable to implement an optimisation algorithm, for example as described with respect to FIG. 2. In examples, the coordination engine service is operable to coordinate operation of the services provided by the ESS application server. In examples, the results data management service (ESS-R) is operable to manage results, such as recommendations generated by the optimisation technique described with respect to FIG. 2 and cooperate with the presentation service (ESS-P) so that recommendations can be displayed to a network optimisation engineer on the ESS web client device 536 and deployed as desired (for example in the semi-manual operation mode described with respect to FIG. 2).

In examples, the user network server 512, EWS application server 520, database server 522, ESS application server 524 and web server 528 are respectively implemented as a computer system, for example, the general purpose computer described with respect to FIG. 4, although it will be appreciated that other server arrangements could be used. In examples, the enterprise client device 534 and the ESS web client device 536 are respectively implemented as general purpose computer devices, such as that described with respect to FIG. 4, although it will be appreciated that other suitable client devices could be used. A method for optimising a self organising network comprising a plurality of cells, in accordance with examples of the disclosure will now be described with reference to FIG. 6.

Figure 6:
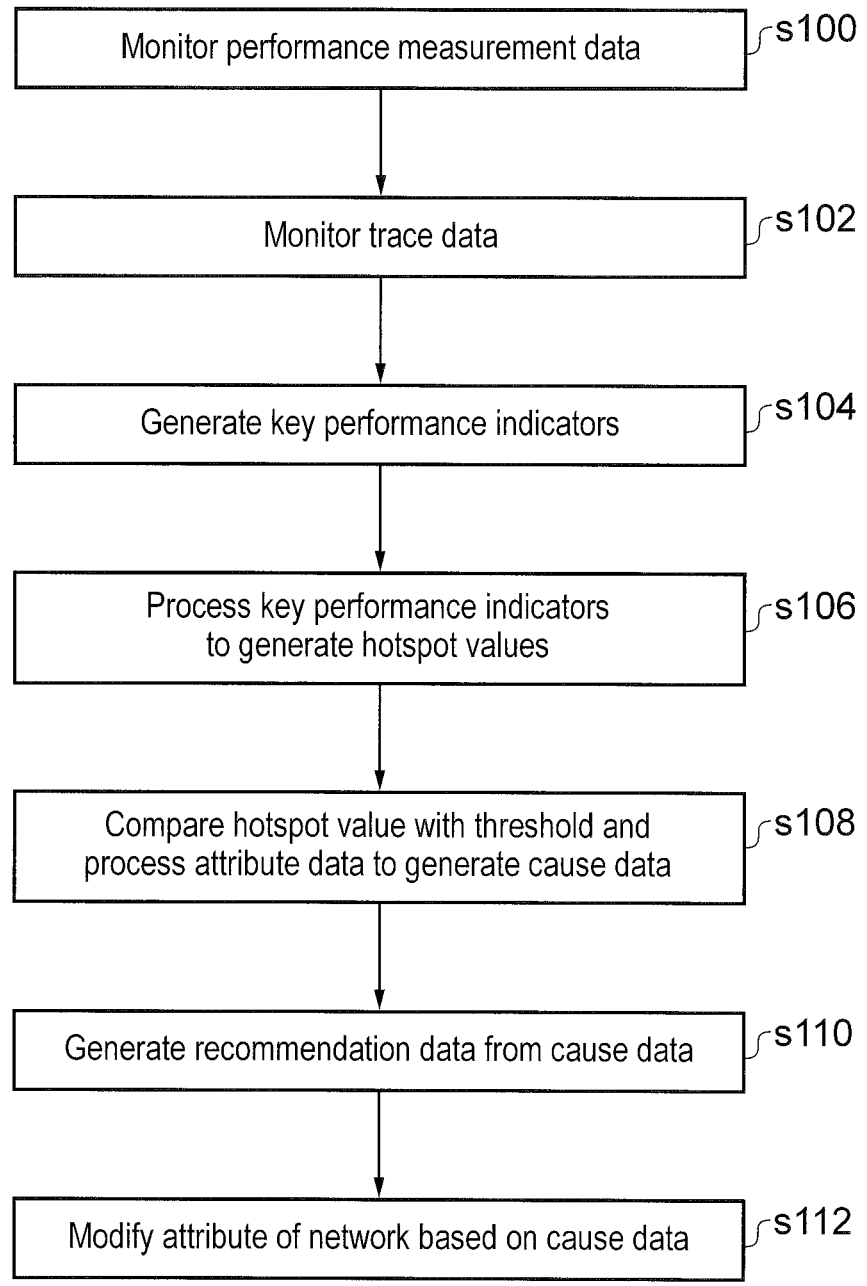
FIG. 6 is a flowchart of an example network optimisation method.

FIG. 6 is a flowchart of an example of a network optimisation method.

At a step s100 performance measurement data indicative of performance of one or more cells in a group of cells in the network is monitored, for example using techniques as described above with reference to steps s10 to s22 of FIG. 2.

At a step s102, trace data indicative of traffic statistics within the cells of the group is monitored, for examples using techniques as described above with reference to steps s10 to s22 of FIG. 2.

At a step s104, a plurality of key performance indicators each indicative of performance of an aspect of a cell in the group are generated from the performance management data and the trace data, for example using techniques described above with reference to steps s24 to s34 of FIG. 2.

At a step s106, the key performance indicators are processed so as to generate a hotspot value indicative of general performance of the cells in the group, for example using techniques described above with reference to steps s24 to s34 of FIG. 2.

At step s108, the hotspot value is compared with a threshold hotspot value, and if the hotspot value is greater than the threshold hotspot value, attribute data from the cells in the group is processed so as to generate cause data indicative of a cause associated with the hotspot value exceeding the hotspot threshold value, for example using techniques described above with reference to steps s36 to s42 of FIG. 2.

At a step s110, recommendation data for modifying an attribute of the network is generated from the cause data, for example using techniques described above with reference to steps s44 to s52 of FIG. 2.

At a step s112, an attribute of the network is modified based on the recommendation data, for example using techniques described above with reference to steps s54 to s62 of FIG. 2. In other words, in examples, at the step s112 (and steps s54 to s62 of FIG. 2 for example), one or more of network settings, network objects, and network hierarchy are modified. In an example, modifying the network settings comprises modifying object attribute data, such as transmit power of a base station. In another example, modification of the network attribute comprises adding an object to an object relationship object. In the examples described herein the term "object" is taken to mean any element or group of elements of the network or attribute or group of attributes of the network, for example neighbour relation objects and/or link objects. In other words, for example, an object could be any of: a cell, a group of cells; a neighbour relation; and a link object, although it will be appreciated that other types of object could also be considered.

In another example, modification of the network attribute comprises removing or inhibiting usage of an object by modifying its presence in a grey list and/or black list. In examples, each cell is designated as being on a black list, grey list, or white list. The black list indicates cells to which handover should not be performed. The grey list indicates cells to which handover can be performed if one or more criteria are satisfied, for example handover to the same RAT (radio access technology) but handover between different radio access technologies is prohibited. The white list indicates cells to which handover may be performed without constraint. However, it will be appreciated that cells may be assigned to the black list, grey list and white list in other suitable manners. In other words, in examples, modification of the network attribute comprises modifying the composition of one or more of the black list, grey list, and white list. It will be appreciated that the modifications mentioned above may be combined as appropriate and applied to network objects and/or distributed SON objects.

In some examples, a signal strength quality of neighbour relation cells of a cell associated with a user device (for example a UE device/mobile device) is detected, for example by a management entity (e.g. management entity 202), and user plane load balancing (for example Mobility Load Balancing in the 3GPP standard Rel-8 onwards) is carried out based on the detected signal strength quality of the neighbour relation cells. In example, the signal strength quality is defined as "good" or "bad".

In examples, a "good" neighbour relation cell has one or more of the following attributes: a signal quality (for example as defined by one or more KPIs) that is greater than a signal quality threshold; a handover success rate which is greater than a handover success rate threshold; and loading on the cell is less than an overload threshold. In some examples, in order for the neighbour relation to be detected as a good neighbour relation, all of these attributes should be satisfied.

In examples, a "bad" neighbour relation cell has one or more of the following attributes: a signal quality below the signal quality threshold; a signal strength below a signal strength threshold; a load which is greater than the overload threshold hold (i.e. the cell is overloaded) and has a handover success rate which is less than the handover success rate threshold. In some examples, in order for the neighbour relation to be detected as a bad neighbour relation, all of these attributes should be satisfied. However, it will be appreciated that other techniques for detecting the signal strength quality of neighbour relation cells could be used.

As mentioned above, in examples, user plane load balancing (mobility load balancing) is carried out based on the detected signal strength quality of the neighbour relation cells. For example, a management entity (e.g. management entity 202, 204) or other suitable network element could modify one or more attributes of the network to carry out user plane load balancing between good and bad neighbour relations cells using techniques described in LTE (as defined in 3GPP Technical Specification 36.300, Rel-10, version 10.5.0, available 3 Oct. 2011 "General E-UTRAN Description" and 3GPP Technical Specification 36.410, Rel-10, version 10.2.0, available 27 Sep. 2011, "S1 General Principles").

The various methods and techniques set out above may be implemented by adaptation of an existing apparatus for example by using a computer program product comprising processor implementable instructions stored on a data carrier (removable storage medium) such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit or bespoke circuit suitable to use in adapting the existing equivalent device.

In conclusion, although a variety of examples have been described herein, these are provided by way of example only, and many variations and modifications on such examples will be apparent to the skilled person and fall within the spirit and scope of the present invention, which is defined by the appended claims and their equivalents.

The invention claimed is:

1. A method of optimising a self organising network comprising a plurality of cells, the method comprising:
   monitoring, by at least one electronic computer processor, performance measurement data indicative of performance of one or more cells in a group of cells in the network;
   monitoring, by the at least one electronic computer processor, trace data indicative of traffic statistics within the cells of the group;
   generating, by the at least one electronic computer processor, from the performance management data and the trace data, a plurality of key performance indicators each indicative of performance of an aspect of a cell in the group;
   processing, by the at least one electronic computer processor, the key performance indicators so as to generate a hotspot value indicative of general performance of the cell in the group;
   comparing, by the at least one electronic computer processor, the hotspot value with a threshold hotspot value, and if the hotspot value is greater than the threshold hotspot value, processing, by the at least one electronic computer processor, attribute data from the cells in the group so as to generate cause data indicative of a cause associated with the hotspot value exceeding the hotspot threshold value;
   generating, by the at least one electronic computer processor, from the cause data, recommendation data for modifying an attribute of the network;
   modifying the attribute of the network, by the at least one electronic computer processor, based on the recommendation data; and
   wherein said processing, by the at least one electronic computer processor, the key performance indicators so as to generate a hotspot value comprises:
      processing, by the at least one electronic computer processor, key performance indicators for each cell in the group so as to generate a respective hotspot value for each cell in the group; and
   wherein said generating, by the at least one electronic computer processor, the recommendation data comprises
      generating, by the at least one electronic computer processor, a recommendation package, which comprises
         recommendation data generated for each cell in the group of cells.

2. The method according to claim 1, wherein monitoring, by the at least one electronic computer processor, the performance management data and the trace data is carried out at a first periodic time interval; and wherein modifying the attribute of the network, by the at least one electronic computer processor, is carried out at a second periodic time interval, the second periodic time interval being longer than the first periodic time interval.

3. The method according to claim 2, wherein the second periodic time interval is an integer multiple of the first periodic time interval.

4. The method according to claim 1, comprising:
   determining, by the at least one electronic computer processor, if the modification of the attribute of the network based on the recommendation data improves the operation of the network, and,
      if not, modifying the attribute of the network, by the at least one electronic computer processor, to remove the modification that was based on the recommendation data.

5. The method according to claim 4, wherein determining, by the at least one electronic computer processor, if the modification improves the operation of the network comprises
   detecting, by the at least one electronic computer processor, if the hotspot value for a cell under consideration is greater after modification of the attribute of the network than the hotspot value for that cell before modification of the attribute of the network, and
      if so, generating, by the at least one electronic computer processor, data indicating that the performance of the network has not improved.

6. The method according to claim 1, comprising monitoring, by the at least one electronic computer processor, the trace data for each cell in the group and for a plurality of sub-cell regions of each cell, the sub-cell regions being smaller than an area of the respective cell.

7. The method according to claim 6, comprising
   monitoring, by the at least one electronic computer processor, the trace data for one or more of:
      base stations associated with the cells in the group;
      sub-groups of cells in the group;
      cells in the group; and
      sub-cell regions of cells in the group.

8. The method according to claim 1, comprising monitoring, by the at least one electronic computer processor, the performance management data for one or more of:
   network level;
   base stations associated with the cells in the group;
   sub-groups of cells in the group;
   cells in the group; and
   neighbour relationships between cells.

9. The method according to claim 1, comprising:
   detecting, by the at least one electronic computer processor, which cells in the group are active cells based on the trace data for those cells; and
   generating, by the at least one electronic computer processor, recommendation data for those cells in the group which are detected as being active.

10. The method according to claim 1 comprising:
    detecting, by the at least one electronic computer processor, trace data which meets a performance criteria for user equipment devices in the network; and
    monitoring, by the at least one electronic computer processor, the trace data comprises monitoring the trace data detected as meeting the performance criteria.

11. The method according to claim 10,
    wherein detecting, by the at least one electronic computer processor, trace data which meets the performance criteria comprises:
       detecting, by the at least one electronic computer processor, which user equipment devices have a call rate greater than a call rate threshold; and
    wherein monitoring, by the at least one electronic computer processor, the trace data comprises
       monitoring, by the at least one electronic computer processor, the trace data for those user equipment devices which are detected as having a call rate greater than a call rate threshold.

12. The method according to claim 1, comprising generating, by the at least one electronic computer processor, a plurality of recommendation packages, and modifying, by the at least one electronic computer processor, the attribute of the network in accordance with a recommendation package selected by a user.

13. The method according to claim 1, comprising limiting, by the at least one electronic computer processor, the modification of the attribute of the network to less than a threshold modification level.

14. The method according to claim 1, comprising:
detecting, by the at least one electronic computer processor, if the performance management data indicates performance of a cell is within a predetermined range and, if not, disregarding, by the at least one electronic computer processor, the performance management data for that cell.

15. The method according to claim 1, comprising detecting, by the at least one electronic computer processor, if a variance in the performance management data over a validation period of time is greater than a performance management data threshold level, and,
if so, disregarding, by the at least one electronic computer processor, that performance management data.

16. The method according to claim 1, comprising detecting, by the at least one electronic computer processor, if a variance in the trace data over a validation period of time is greater than a trace data threshold level, and,
if so, disregarding, by the at least one electronic computer processor, that trace data.

17. The method according to claim 1, wherein the group of cells comprises all of the cells in the network.

18. The method according to claim 17, wherein the group of cells comprises
cells selected by a user.

19. The method according to claim 1, wherein:
monitoring, by the at least one electronic computer processor, the trace data comprises
monitoring, by the at least one electronic computer processor, sub-cell performance data; and the method comprises;
determining, by the at least one electronic computer processor, from hotspot values generated for the group of cells, a processing order indicative of an order of cells for which attributes should be modified, the processing order being arranged, by the at least one electronic computer processor, so that each cell in the group is listed once in the processing order; and
generating, by the at least one electronic computer processor, the recommendation data comprises generating, by the at least one electronic computer processor, the recommendation data sequentially according to the processing order.

20. The method according to claim 1, comprising:
detecting, by the at least one electronic computer processor, a signal strength quality of neighbour relation cells of a cell associated with a user device; and
carrying out user plane load balancing, by the at least one electronic computer processor, based on the detected signal strength quality of the neighbour relation cells.

21. The method according to claim 1, wherein said monitoring said trace data comprises at least one of:
radio connection data relating to a number of radio connections between a mobile and a radio access network;
anonymous mobile reference data relating to a number of user equipment devices with active traffic;
number of radio bearers and bit rate volume of radio bearers per connection per quality of service descriptor;
traffic load data relating to uplink and downlink traffic load per discernable quality of service;
bit rate throughput data relating to throughput bit rater per quality of service; or
signaling load data relating to signaling load.

22. The method according to claim 1, wherein said monitoring said trace data comprises:
radio connection data relating to a number of radio connections between a mobile and a radio access network;
anonymous mobile reference data relating to a number of user equipment devices with active traffic;
number of radio bearers and bit rate volume of radio bearers per connection per quality of service descriptor;
traffic load data relating to uplink and downlink traffic load per discernable quality of service;
bit rate throughput data relating to throughput bit rater per quality of service; and
signaling load data relating to signaling load.

23. The method according to claim 1, wherein said optimization system is configured to distinguish between conversational call or session, and best efforts/interactive call or session data based on a quality of service descriptor data generated from sub-cell data comprising at least one of:
protocol reference indexed data comprising at least one of:
Protocol Procedural identity (ID) data;
Protocol Stream ID data;
Protocol Tunnel ID data; or
Other ID data;
mobile reference indexed data comprising at least one of:
International Mobile Subscriber Identity (IMSI) data;
UTRAN Registration Identity (Uri) data;
Temporary Mobile Subscriber Identity (TMSI) data; or
Other Identity data; or
data derived from sub-cell performance tag data.

24. A computer program product embodied on a nontransitory computer accessible medium, which when executed on at least one computer processor, performs a method comprising:
monitoring, by at least one electronic computer processor, performance measurement data indicative of performance of one or more cells in a group of cells in the network;
monitoring, by the at least one electronic computer processor, trace data indicative of traffic statistics within the cells of the group;
generating, by the at least one electronic computer processor, from the performance management data and the trace data, a plurality of key performance indicators each indicative of performance of an aspect of a cell in the group;
processing, by the at least one electronic computer processor, the key performance indicators so as to generate a hotspot value indicative of general performance of the cell in the group;
comparing, by the at least one electronic computer processor, the hotspot value with a threshold hotspot value, and if the hotspot value is greater than the threshold hotspot value, processing, by the at least one electronic computer processor, attribute data from the cells in the group so as to generate cause data indicative of a cause associated with the hotspot value exceeding the hotspot threshold value;
generating, by the at least one electronic computer processor, from the cause data, recommendation data for modifying an attribute of the network;
modifying the attribute of the network, by the at least one electronic computer processor, based on the recommendation data; and
wherein said processing, by the at least one electronic computer processor, the key performance indicators so as to generate a hotspot value comprises:
processing, by the at least one electronic computer processor, key performance indicators for each cell in the group so as to generate a respective hotspot value for each cell in the group; and
wherein said generating, by the at least one electronic computer processor, the recommendation data comprises
generating, by the at least one electronic computer processor, a recommendation package, which comprises
recommendation data generated for each cell in the group of cells.

25. A nontransitory storage medium which is arranged to store the program according to claim 24.

26. An apparatus for optimising a self organising network comprising a plurality of cells, the apparatus comprising:
at least one memory; and
at least one electronic computer processor coupled to said memory, said at least one electronic computer processor configured to:
monitor performance management data indicative of performance of one or more cells in a group of cells in the network;
monitor trace data indicative of traffic statistics within the cells of the group;
generate, from the performance management data and the trace data, a plurality of key performance indicators each indicative of performance of an aspect of a cell in the group;
process the key performance indicators so as to generate a hotspot value indicative of general performance of the cell in the group;
compare the hotspot value with a threshold hotspot value, and if the hotspot value is greater than the threshold hotspot value, process attribute data from the cells in the group so as to generate cause data indicative of a cause associated with the hotspot value exceeding the hotspot threshold value;
generate, from the cause data, recommendation data for modifying an attribute of the network; and
modify the attribute of the network based on the recommendation data; and
wherein said process the key performance indicators so as to generate a hotspot value comprises:
the electronic computer processor configured to process key performance indicators for each cell in the group so as to generate a respective hotspot value for each cell in the group; and
wherein said generate the recommendation data comprises
the electronic computer processor configured to generate a recommendation package, which comprises
the electronic computer processor configured so recommendation data is generated for each cell in the group of cells.

27. An apparatus for optimising a self organising network comprising a plurality of cells, the apparatus comprising:
a performance management data monitoring unit comprising at least one electronic computer processor and at least one memory coupled to said at least one electronic computer processor, said at least one electronic computer processor configured to monitor performance management data indicative of performance of one or more cells in a group of cells in the network;
a trace data monitor unit configured to enable said at least one electronic computer processor to monitor trace data indicative of traffic statistics within the cells of the group;
a key performance indicator generation unit configured to enable said at least one electronic computer processor to generate, from the performance management data and the trace data, a plurality of key performance indicators each indicative of performance of an aspect of a cell in the group;
a processor unit configured to enable said at least one electronic computer processor to process the key performance indicators so as to generate a hotspot value indicative of general performance of the cell in the group;
a comparator configured to enable said at least one electronic computer processor to compare the hotspot value with a threshold hotspot value, and if the hotspot value is greater than the threshold hotspot value, process attribute data from the cells in the group configured to enable said at least one electronic computer processor to generate cause data indicative of a cause associated with the hotspot value exceeding the hotspot threshold value;
a generator unit configured to enable said at least one electronic computer processor to generate, from the cause data, recommendation data for modifying an attribute of the network; and
a modification unit configured to enable said at least one electronic computer processor to modify the attribute of the network based on the recommendation data; and
wherein said processor unit is configured the key performance indicators so as to generate a hotspot value comprises:
configured to process key performance indicators for each cell in the group so as to generate a respective hotspot value for each cell in the group; and
wherein said generator unit comprises
the generator unit configured to generate a recommendation package, which comprises
the generator unit configured so recommendation data is generated for each cell in the group of cells.

* * * * *